United States Patent
Ito et al.

(10) Patent No.: US 10,249,905 B2
(45) Date of Patent: Apr. 2, 2019

(54) ALL-SOLID-STATE SECONDARY BATTERY AND METHOD FOR MANUFACTURING SAME

(71) Applicant: TAIYO YUDEN CO., LTD., Tokyo (JP)

(72) Inventors: Daigo Ito, Tokyo (JP); Masaki Mochigi, Tokyo (JP); Masataka Tomita, Tokyo (JP); Toshimasa Suzuki, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/826,213

(22) Filed: Nov. 29, 2017

(65) Prior Publication Data

US 2018/0090784 A1    Mar. 29, 2018

Related U.S. Application Data

(60) Division of application No. 14/971,678, filed on Dec. 16, 2015, now Pat. No. 9,865,899, which is a
(Continued)

(30) Foreign Application Priority Data

Jun. 28, 2013  (JP) .................................. 2013-136369

(51) Int. Cl.
*H01M 10/0562* (2010.01)
*H01M 4/04* (2006.01)
(Continued)

(52) U.S. Cl.
CPC ..... *H01M 10/0562* (2013.01); *H01M 4/0471* (2013.01); *H01M 4/136* (2013.01);
(Continued)

(58) Field of Classification Search
CPC ........... H01M 10/0562; H01M 4/0471; H01M 4/136; H01M 4/1397; H01M 10/052;
(Continued)

(56) References Cited

U.S. PATENT DOCUMENTS

2007/0231704 A1   10/2007  Inda
2012/0244334 A1*   9/2012  Park ..................... H01M 4/131
                                                          428/221
2013/0280613 A1   10/2013  Akedo et al.

FOREIGN PATENT DOCUMENTS

JP    2007-294429 A    11/2007
JP    2014-49198 A     3/2014
(Continued)

OTHER PUBLICATIONS

Ito et al., "Olivine Seikyoku/Sankabutsukei Kotai Denkaishitsu o Mochnta Zenkotai Denchi no Kento, All Solid State Batteries using Olivine Cathodes and NASICON Electrolytes", Abstracts, Battery Symposium in Japan, Oct. 6, 2013 (Oct. 6, 2013), vol. 54th, p. 338.
(Continued)

*Primary Examiner* — Gary D Harris
(74) *Attorney, Agent, or Firm* — Chen Yoshimura LLP

(57) ABSTRACT

An all-solid-state secondary battery, including: a solid electrolyte layer; a positive electrode layer including a positive electrode active material layer and a first current collector layer; a negative electrode layer including a second current collector layer, the positive electrode layer and the negative electrode layer sandwiching the solid electrolyte layer; and external electrodes connected respectively to the first current collector layer and the second current collector layer, wherein the positive electrode active material layer is formed of an olivine-type active material, wherein the solid electrolyte layer is formed of a phosphate having a NASICON-type structure, and wherein the solid electrolyte layer contains particulate precipitate having an olivine-type crys-
(Continued)

tal structure that includes a same element as an element forming the positive electrode active material layer.

3 Claims, 32 Drawing Sheets

Related U.S. Application Data continuation of application No. PCT/JP2014/055021, filed on Feb. 28, 2014.

(51) Int. Cl.
  *H01M 4/136* (2010.01)
  *H01M 4/1397* (2010.01)
  *H01M 4/58* (2010.01)
  *H01M 10/052* (2010.01)
  *H01M 4/02* (2006.01)

(52) U.S. Cl.
  CPC ....... *H01M 4/1397* (2013.01); *H01M 4/5825* (2013.01); *H01M 10/052* (2013.01); *H01M 2004/028* (2013.01); *H01M 2004/029* (2013.01); *H01M 2300/0068* (2013.01)

(58) Field of Classification Search
  CPC ......... H01M 4/5825; H01M 2004/028; H01M 2004/029; H01M 2300/0068; Y02P 70/54
  USPC ........................................................ 429/162
  See application file for complete search history.

(56) References Cited

FOREIGN PATENT DOCUMENTS

| WO | 2013/038948 A1 | 3/2013 |
| WO | 2013/073290 A1 | 5/2013 |
| WO | 2013/175991 A1 | 11/2013 |

OTHER PUBLICATIONS

International Search Report (ISR) issued in PCT/JP2014/055021 dated May 2014. (Cited in the parent U.S. Appl. No. 14/971,678.).
Written Opinion (PCT/ISA/237) issued in PCT/JP2014/055021 dated May 2014. (Cited in the parent U.S. Appl. No. 14/971,678.).
Ito et al., "Olivine Seikyoku/Sankabutsukei Kotai Denkaishitsu o Mochiita Zenkotai Denchi no Kento, All Solid State Batteries using Olivine Cathodes and NASICON Electrolytes", Abstracts, Battery Symposium in Japan, Oct. 6, 2013 (Oct. 6, 2013), vol. 54th, p. 338 (Cited in the parent U.S. Appl. No. 14/971,678 and English abstract included as a concise explanation of.

* cited by examiner

|  |  | Experiment | Details | Powder Mixture Sintering Experiment | SE Disk Electrical Properties | Diffusion Experiment |
|---|---|---|---|---|---|---|
|  |  |  |  | $Mn_2P_2O_7$/LMP (650°C) | Total Ionic Conductivity (25°C) | Interface State |
| M=Mn | Working Example 1 | Mn-LATP/LMP | Mn=0.2 | 1.3% | $5.0 \times 10^{-4}$ S/cm | Good |
|  | Working Example 2 | Mn-LATP/LMP | Mn=0.15 | 4.5% | $3.9 \times 10^{-4}$ S/cm | Good |
|  | Working Example 3 | Mn-LATP/LMP | Mn=0.1 | 4.5% | $3.1 \times 10^{-4}$ S/cm | Good |
|  | Working Example 4 | Mn-LATP/LMP | Mn=0.05 | 8.7% | $2.3 \times 10^{-4}$ S/cm | Good |
|  | Working Example 5 | Mn-LATP/LMP | Mn=0.25 | 1.4% | $3.4 \times 10^{-4}$ S/cm | Good |
|  | Working Example 6 | Mn-LATP/LMP | Mn=0.3 | 0.0% | $1.8 \times 10^{-4}$ S/cm | Good |
|  | Comparative Example 1 | LATP/LMP | Mn=0 | 24.2% | $2.1 \times 10^{-4}$ S/cm | Not good Mn diffusion |
|  | Comparative Example 2 | Mn-LATP/LMP | Mn=0.03 | 33.0% | $2.1 \times 10^{-4}$ S/cm | Not good Mn diffusion |
| M=Co, Ni | Working Example 7 | Co-LATP/LCP | Co=0.20 | – | $5.2 \times 10^{-4}$ S/cm | Good |
|  | Working Example 8 | Na-LATP/LNP | Ni=0.20 | – | $2.4 \times 10^{-4}$ S/cm | Good |
|  | Comparative Example 3 | LATP/LCP | Co=0 | – | – | Not good Co diffusion |
|  | Comparative Example 4 | LATP/LNP | Ni=0 | – | – | Not good Ni diffusion |

FIG. 22

ALL-SOLID-STATE SECONDARY BATTERY AND METHOD FOR MANUFACTURING SAME

BACKGROUND OF THE INVENTION

Technical Field

The present invention relates to an all-solid-state secondary battery and a method for manufacturing the same.

Background Art

Patent Document 1 discloses using $Li_{1+x+y}(Al, Ga)_x(Ti, Ge)_{2-x}Si_yP_{3-y}O_{12}$, where $0 \leq x \leq 1$ and $0 \leq y \leq 1$, as a solid electrolyte for an all-solid-state secondary battery.

RELATED ART DOCUMENT

Patent Document

Patent Document 1: Japanese Patent Application Laid-Open Publication No. 2007-294429

SUMMARY OF THE INVENTION

When an olivine-type positive electrode active material ($LiMPO_4$, M=Mn, Co, Ni) is used and sintered at the same time as the solid electrolyte ($Li_{1+x+y}(Al, Ga)_x(Ti, Ge)_{2-x}Si_yP_{3-y}O_{12}$, where $0 \leq x \leq 1$ and $0 \leq y \leq 1$), Li and M (M=Mn, Co, Ni) tend to diffuse out of the positive electrode active material ($LiMPO_4$, M=Mn, Co, Ni). This diffusion can potentially reduce the amount of active material, alter the properties of the solid electrolyte, or affect charging/discharging.

Meanwhile, it is preferable that the positive electrode active material and the solid electrolyte be sintered at the same time in order to simplify the overall manufacturing process.

The present invention aims to provide an all-solid-state secondary battery and a method for manufacturing the same in which diffusion of Li and M from the positive electrode active material to the solid electrolyte can be inhibited even when using an olivine-type positive electrode active material and sintering that olivine-type positive electrode active material at the same time as the solid electrolyte. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides an all-solid-state secondary battery, including: a solid electrolyte layer; a positive electrode layer including a positive electrode active material layer and a first current collector layer; a negative electrode layer including a second current collector layer, the positive electrode layer and the negative electrode layer sandwiching the solid electrolyte layer; and external electrodes connected respectively to the first current collector layer and the second current collector layer, wherein the positive electrode active material layer is formed of an olivine-type active material, wherein the solid electrolyte layer is formed of a phosphate having a NASICON-type structure, and wherein the solid electrolyte layer contains particulate precipitate having an olivine-type crystal structure that includes a same element as an element forming the positive electrode active material layer.

In another aspect, the present disclosure provides a method for manufacturing an all-solid-state secondary battery, including: sintering, at the same time together, a solid electrolyte layer containing a phosphate having a NASICON-type structure and a positive electrode active material layer formed of an olivine-type active material $LiMPO_4$ to form a sintered compact, where M is a transition metal; and adding, to a material for forming the solid electrolyte layer before the sintering, 0.05 moles to 0.3 moles of a transition metal element that is the same as the transition metal M used in the positive electrode active material layer for every 1 mole of the phosphate in the material for forming the solid electrolyte layer.

The present invention makes it possible to provide an all-solid-state secondary battery and a method for manufacturing the same in which diffusion of Li and M from the positive electrode active material to the solid electrolyte can be inhibited even when using an olivine-type positive electrode active material and sintering that olivine-type positive electrode active material at the same time as the solid electrolyte.

It is to be understood that both the foregoing general description and the following detailed description are exemplary and explanatory, and are intended to provide further explanation of the invention as claimed.

BRIEF DESCRIPTION OF THE DRAWINGS

FIG. 22 is a table summarizing the results of Working Examples 1 to 8 and Comparative Examples 1 to 4.

FIG. 24A is an exterior perspective view illustrating a rectangular prism-shaped all-solid-state secondary battery. FIG. 24B is a cross-sectional view taken along line B-B'.

DETAILED DESCRIPTION OF EMBODIMENTS

Figure 1:
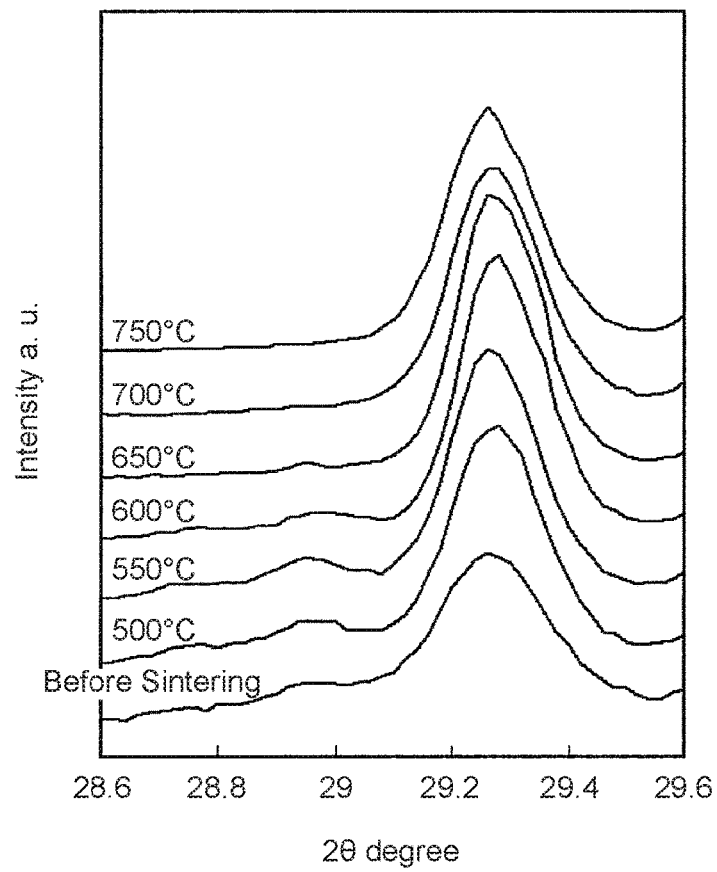
FIG. 1 is a graph showing the XRD measurement results for Working Example 1 (Mn/LATP=0.20).

Next, preferred working examples of the present invention will be described in detail with reference to figures.

The all-solid-state secondary battery in one aspect of the present invention is manufactured by arranging at least a positive electrode active material layer and a solid electrolyte layer in contact with one another and then sintering the assembly to form a good interface bond. The best mode for carrying out the invention will be described in detail below.

Configuration of Components

In one aspect of the present invention, it is preferable that a material with an olivine-type structure and a general formula of $LiMPO_4$ be used for the positive electrode active material layer. Here, M is at least one element of manganese (Mn), cobalt (Co), and nickel (Ni). In one aspect of the present invention, a positive electrode active material layer that contains manganese (Mn) exhibits the most significant beneficial effects, but a positive electrode active material layer made from an element other than manganese (Mn) such as cobalt (Co) or nickel (Ni) also exhibits beneficial effects and may be used. Using one of these elements makes it possible to reduce diffusion to a solid electrolyte layer made from a transition metal and also makes it possible to reduce diffusion to a solid electrolyte layer made from lithium (Li) (which occurs at a lower temperature), thereby making it possible to reduce the reactivity of the positive electrode active material layer in comparison with conventional technologies.

It is preferable that the base solid electrolyte layer have a NASICON-type crystal structure because this structure exhibits high conductivity of lithium ions and is also stable in air. Among such materials, those with a general formula of $Li_{1+x}Al_xTi_{2-x}(PO_4)_3$ (below, simply "LATP") are the most preferable. A portion of the phosphate structure may be substituted with silicon (Si). A portion of the titanium (Ti) may be substituted with another transition metal such as germanium (Ge) or zirconium (Zr). A portion of the aluminum (Al) may be substituted with another trivalent transition metal such as gallium (Ga), indium (In), or lanthanum (La). It is preferable that the aluminum Al contain a trivalent transition metal (with x>0) in order to increase the amount of Li. The greater the amount of Li, the more the diffusion of Li from the positive electrode active material layer can be inhibited.

The solid electrolyte layer in one aspect of the present invention is formed using a phosphate with a NASICON-type structure and an $AB_2(PO_4)_3$ skeleton.

When none of the elements are substituted, the solid electrolyte layer can be written as $LiTi_2(PO_4)_3$.

When some of the elements will be substituted, the solid electrolyte layer can be written as follows.

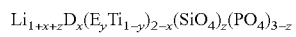

$Li_{1+x+z}D_x(E_yTi_{1-y})_{2-x}(SiO_4)_z(PO_4)_{3-z}$ (Here, $0 \leq x \leq 0.8$, $0 \leq y < 1$, and $0 \leq z \leq 0.5$. The element D is at least one element of trivalent aluminum (Al) and gallium (Ga), and the element E is at least one element of quadrivalent germanium (Ge) and zirconium (Zr).)

Adding a transition metal to this base solid electrolyte layer makes it possible to significantly reduce the reactivity of the solid electrolyte layer with the positive electrode active material layer. Adding a transition metal also improves sinterability of the solid electrolyte layer and makes it easier to obtain a dense sintered compact at a relatively low temperature. For example, adding 0.2 moles of manganese (Mn) for every 1 mole of LATP makes it possible to achieve a density of greater than or equal to 97% of the theoretical density at a sintering temperature of 850° C. When Mn is not added, only a density of approximately 85% of the theoretical density can be achieved at a sintering temperature of 850° C. The transition metal starting material such as manganese (Mn) or cobalt (Co) may be added while synthesizing the LATP itself or after the LATP is synthesized while mixing a slurry for forming a green sheet. Moreover, the amounts of the other constituent elements may be adjusted according to the amount of transition metal added to achieve a stoichiometric composition for the overall compound, or the transition metal may simply be added to a stoichiometric LATP composition. In this way, some of the added transition metal will solid-dissolve into the LATP, and some of the transition metal will precipitate out as particulate $LiMPO_4$. This is because the transition element M cannot be solid-dissolved in excess in the LATP, and the conditions that cause the same $LiMPO_4$ compound used for the positive electrode active material layer to precipitate from solution are the same conditions that best inhibit the diffusion reaction of elements from the positive electrode active material layer. In other words, simply using LATP in which the transition element M is solid-dissolved (M-LATP) does not make it possible to sufficiently inhibit the diffusion reaction of elements from the positive electrode active material layer. The minimum amount of the transition element M that must be added is the amount at which $LiMPO_4$ starts to precipitate out, and the maximum amount that can be added is the amount at which a second phase starts to appear and the NASICON-type structure starts to become significantly less predominant. More specifically, it is preferable that the amount of the transition metal M added be greater than or equal to 0.05 moles and less than or equal to 0.40 moles for each mole of LATP. More preferable is greater than or equal to 0.10 moles and less than or equal to 0.30 for each mole of LATP.

Methods for forming the negative electrode layer include forming a negative electrode active material layer on a current collector layer or forming only a current collector layer.

In the former method, examples of materials for the current collector layer include carbon (C); metals such as nickel (Ni), copper (Cu), palladium (Pd), gold (Au), silver (Ag), aluminum (Al), and iron (Fe); and alloys of these metals. Examples of materials for the negative electrode active material layer include $Li_4Ti_5O_{12}$, $TiO_2$, $Li_3Fe_2(PO_4)_3$, and $LiFeP_2O_7$. Although oxides such as $Li_4Ti_5O_{12}$ and $TiO_2$ may be used for the negative electrode active material layer, oxides tend to exhibit increased reactivity with the solid electrolyte layer when heat treated at high temperatures. Therefore, it is preferable that a phosphate similar to that used for the solid electrolyte layer be used for the negative electrode active material layer. Although $Li_3Fe_2(PO_4)_3$ and $LiFeP_2O_7$ may be used, Fe-containing compounds have a relatively high operating voltage of approximately 3V (vs. $Li/Li^+$) and tend to yield slightly smaller voltages when used in batteries. Meanwhile, using a compound that contains Ti such as $LiTi_2(PO_4)_3$ or LATP makes it possible to achieve an operating voltage of approximately 2.5V (vs. $Li/Li^+$).

In the latter method (which is the better method), an LATP solid electrolyte layer is used, and only a negative electrode current collector is formed (a separate negative electrode active material layer is not formed). In this method, the portion of the solid electrolyte layer near the negative electrode current collector functions as the negative electrode active material. Here, using a NASICON-type phosphate that contains Ti such as $LiTi_2(PO_4)_3$ or LATP for the solid electrolyte layer makes it possible to achieve an operating voltage of approximately 2.5V (vs. $Li/Li^+$) in most cases.

In this case, examples of materials for the current collector layer include carbon (C); metals such as nickel (Ni), copper (Cu), palladium (Pd), gold (Au), silver (Ag), aluminum (Al), and iron (Fe); and alloys of these metals.

Configuration of All-Solid Secondary Battery

Next, a configuration of an all-solid-state secondary battery will be described. Making the solid electrolyte layer and the positive electrode active material layer (and, when present, the negative electrode active material layer) as thin as possible and using as many layers as possible tends to decrease resistance and increase energy density. Therefore, it is preferable that these layers be formed as thin films. In addition, low cost is generally a selling point for energy devices, and therefore it is important that a low-cost process be used to produce the battery. For these reasons, using a layering process that makes it possible to produce thin films at low cost is the best way of making it possible to produce the overall batteries in large quantities and at low cost.

Figure 24A:
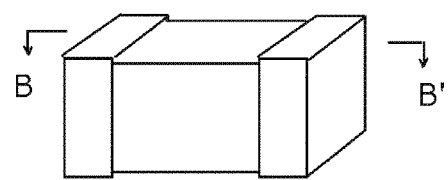
FIGS. 24A and 24B illustrate the multilayer structure of an all-solid-state secondary battery.
Figure 24B:
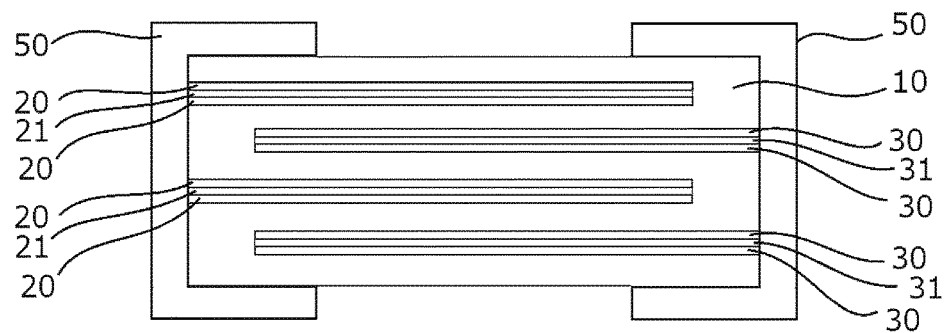

FIGS. 24A and 24B illustrate the multilayer structure of an all-solid-state secondary battery. FIG. 24A is an exterior perspective view illustrating the multilayer all-solid-state secondary battery. As illustrated in FIG. 24A, the all-solid-state secondary battery may be formed as a rectangular prism several mm in length, width, and height in size. FIG. 24B is a cross-sectional view taken along line B-B' in FIG. 24A. A large number of all-solid-state secondary cells each including a current collector 21, a positive electrode active material layer 20, a solid electrolyte layer 10, a negative electrode active material layer 30, and a current collector 31 arranged in that order are layered together. The plurality of all-solid-state secondary cells are connected in parallel to increase the overall battery capacity by connecting the current collectors to respective external electrodes 50.

FIGS. 24A and 24B illustrate a substantially rectangular prism-shaped all-solid-state secondary battery, but a disk-shaped multilayer all-solid-state secondary battery (coin battery) may also be formed.

Process for Manufacturing All-Solid Secondary Battery

Figure 25:
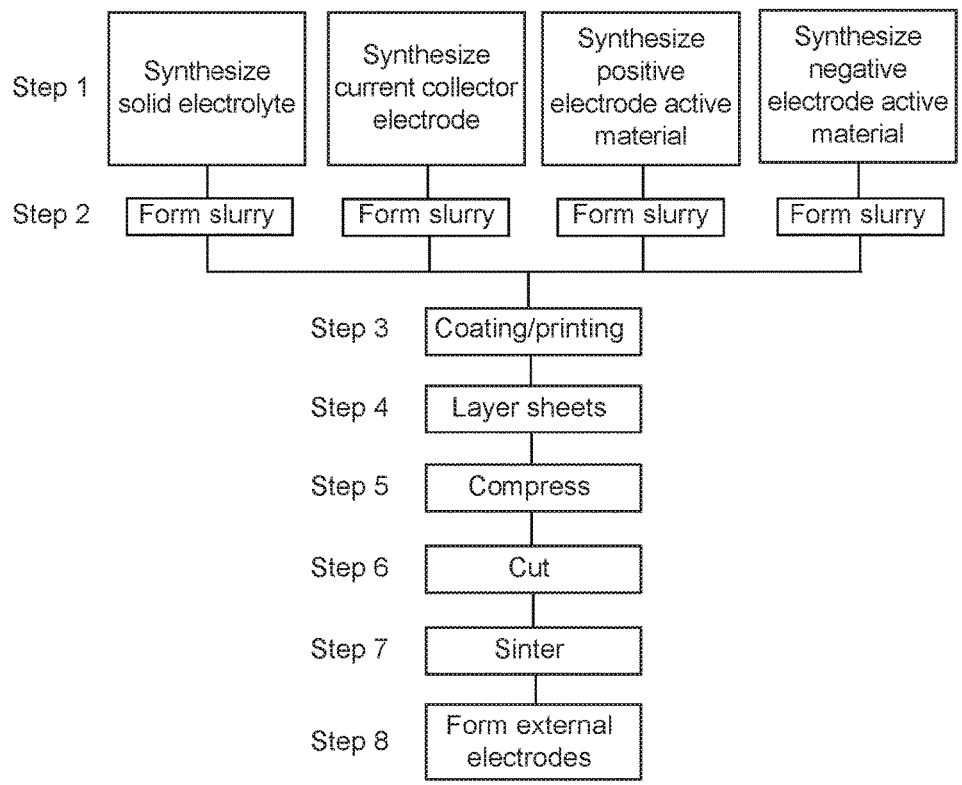
FIG. 25 is a flowchart illustrating a method for manufacturing an all-solid-state secondary battery.

FIG. 25 is a flowchart illustrating a process for manufacturing an all-solid-state secondary battery. First, in step 1, the compositions for the solid electrolyte layer, the current collectors, and the positive electrode active material layer (and, when necessary, the negative electrode active material layer) are synthesized. Next, in step 2, each synthesized composition is formed into a slurry. These slurries are formed by adding a binder, an organic solvent, and a plasticizer to liquefy each composition.

Then, in step 3, these slurries are applied using a coating/printing process. For example, the solid electrolyte layer is printed with a thickness of 15 μm, the positive (and negative) active material layers are printed with a thickness of 5 μm, and the current collectors are printed with a thickness of 5 μm. Next, in step 4, the sheets formed in the coating/printing process are layered together. Twenty layers of sheets are layered together, for example. Then, in step 5, the multilayer sheet thus formed is compressed by applying a pressure of 40 MPa, for example. Next, in step 6, the multilayer sheet is cut. The multilayer sheet is cut into 25×15 mm chips, for example. Step 7 is a sintering process. The chips are sintered at 800° C. for 180 minutes, for example. In step 8, the external electrodes are formed. The external electrodes are formed by applying a coating of a paste that contains a resin and silver (Ag) and drying at 150° C., for example.

More specifically, the printing process in step 3 includes taking the solid electrolyte slurry and forming green sheets using any of a variety of printing schemes, and then pattern-printing the positive or negative electrode active materials on the green sheets using any of a variety of printing schemes. Next, in the layering process in step 4, the positive electrode green sheets and the negative electrode green sheets are layered together alternately. In the cutting process in step 6, the multilayer green sheet is cut into chips. In the sintering process in step 7, these chips are heat treated.

First, the production of the green sheets will be described in more detail. The solid electrolyte material is synthesized and processed as needed to achieve a suitable granularity. A slurry is then formed by adding a binder, a dispersant, a plasticizer, or the like and water or an organic solvent to uniformly disperse the solid electrolyte material. A pot mill, a bead mill, a wet jet mill, various mixing machines, a high pressure homogenizer, or the like may be used to produce the slurry. However, it is most preferable that a bead mill be used because a bead mill can adjust to the appropriate particle size distribution and disperse the material at the same time. The slurry is then coated on a surface to form a sheet of the desired thickness. The coating scheme is not particularly limited. Any well-known coating method such as slot die coating, reverse coating, gravure coating, bar coating, or doctor blade coating may be used.

Next, the method for forming the current collector layers and the active material layers will be described. Examples of materials that can be used for the current collector layer include carbon (C); metals such as nickel (Ni), copper (Cu), palladium (Pd), gold (Au), silver (Ag), aluminum (Al), and iron (Fe); and alloys of these metals. Pastes for forming the current collector layers and the active material layers are produced as appropriate. The method for producing these pastes is not particularly limited, but because these pastes may be printed on top of a solid electrolyte green sheet or on top of another current collector layer or active material layer, it is preferable that the solvents in the pastes not penetrate into the underlying material and cause structural deterioration in the underlying sheets or portions of the printed electrodes such as the active material layers. Any well-known mixing technology such as a bead mill, a planetary paste mixer, an automatic grinder, a three roll mill, a high-shear mixer, or a planetary mixer may be used to produce the pastes. The pastes thus produced are then printed in patterns of a desired shape. First, the positive electrode (or negative electrode) active material paste is printed on top of the green sheet. Next, the current collector paste is printed on top of that active material layer, and then another layer of the positive electrode (or negative electrode) active material paste is printed on top of the current collector layer. This multilayer printed assembly forms a positive electrode (or negative electrode) unit. The pattern printing method used to do this is not particularly limited. A method such as screen printing, intaglio printing, or relief printing may be used. Screen printing is the most typically used method when forming a multilayer device with a large number of very thin layers, but there are also cases in which inkjet printing may be more suitable, such as when forming extremely fine electrode patterns or special electrode shapes. After producing the positive electrode unit and the negative electrode unit, a plurality of such units are layered together alternately with a slight offset between each layer.

Next, the processes for layering and cutting the green sheets and forming the external electrodes will be described. After layering together the pattern-printed green sheets, the pattern-printed green sheets are compressed using a well-known method and then cut into chip-shaped sections. Cover layers that include a large number of green sheets layered together may be formed on the top and bottom of the main multilayer portions. The solid electrolyte material or an insulating material may be used for the cover layers. The heat treatment may be performed after forming the external electrodes, or the external electrodes may be formed after performing the heat treatment, as necessary. A lead frame suitable for the exterior package or mounting may also be formed as necessary. In most cases, the all-solid-state secondary battery will have a definite polarity, and therefore the external electrodes, exterior package, lead frame, or the like should be shaped in a way that makes it possible to visually distinguish between the positive and negative electrodes. Alternatively, green sheets on which patterns that make it possible to visually distinguish between the positive and negative electrodes are printed may be used as parts of the cover layers. In this case, it is preferable that the patterned green sheets not be arranged as the outermost layers but rather as layers several μm to several dozen μm further interior in order to prevent the patterns from peeling off or causing shorts. The same paste used for the current collectors may be used for these patterns.

If the material used for the current collectors is not well-suited to being heat treated in an oxidizing atmosphere, the heat treatment should be performed in a non-oxidizing atmosphere. In one aspect of the present invention, it is preferable that the temperature range for the heat treatment be 700° C. to 1000° C. It is more preferable that the temperature range be 750° C. to 950° C., and it is most preferable that the temperature range be 800° C. to 900° C. It is preferable that the maximum temperature be maintained for 10 minutes to 10 hours, more preferable that the maximum temperature be maintained for 30 minutes to 5 hours, and even more preferable that the maximum temperature be maintained for 1 to 3 hours. It is not preferable that the maximum temperature be maintained for too short a time because the interior and exterior portions of the structure may not be sintered uniformly. Moreover, if the maximum temperature is maintained for too long, manufacturing throughput suffers and process costs increase. Furthermore, an additional process in which the chips are held at a temperature lower than the maximum temperature in an oxidizing atmosphere before going to the maximum temperature may be included in order to ensure that the binder is sufficiently removed. The lower limit for the maximum temperature is defined by the temperature at which the solid electrolyte layer, the current collectors, and the like typically begin to undergo densification due to the sintering process. Densification of the solid electrolyte layer and the current collectors due to sintering is one of the biggest factors determining the characteristics of the resulting device, and therefore the lower limit for the maximum temperature must be at least equal to the minimum temperature at which this densification occurs. Meanwhile, the upper limit for the maximum temperature may be defined either by the temperature at which the solid electrolyte layer and the current collectors begin to melt or degrade or by the temperature at which the characteristics of the battery begin to deteriorate due to migration of materials, chemical reactions, or the like that may occur in the active material layers at high temperatures. Moreover, because it is preferable that as low a sintering temperature as possible be used in order to minimize process costs, there are also cases in which the upper limit for the maximum temperature is defined by cost-related considerations.

After the heat treatment, a reoxidization treatment may be performed on the all-solid-state secondary battery.

Next, aspects of the present invention will be described in more detail using working examples. Note, however, that the present invention is not limited in any way to the configurations presented in these working examples.

Characterizing the Diffusion Mechanism

In order to solve the abovementioned problem, the inventors researched the mechanisms that cause the transition metal M in LiMPO$_4$ to diffuse towards a phosphate-type solid electrolyte layer. The inventors found that the mechanisms were the diffusion of Li, formation of an Li—P—O liquid phase, and leaching of the transition metal M into the liquid phase, which occur in that order (Comparative Examples 1, 3, and 4).

First, Comparative Example 1, one of several experiments performed to characterize the diffusion mechanism, will be described.

Comparative Example 1

Comparative Example 1 is an experiment for characterizing the diffusion mechanism when manganese (Mn) is used as the transition metal M.

Preparation of Solid Electrolyte (Comparative Example 1)

First, the starting materials Li$_2$CO$_3$, α-Al$_2$O$_3$, anatase TiO$_2$, and NH$_4$H$_2$PO$_4$ were mixed together in amounts appropriate for obtaining an oxide molar ratio of 0.65 LiO/0.15 Al$_2$O$_3$/1.7 TiO$_2$/1.5 P$_2$O$_5$ and pre-fired at 850° C. in air to cause a solid phase reaction. The resulting powder was then crushed in a wet bead mill to a particle size distribution with D$_{50}$=1 μm as measured by laser diffraction. This powder was used as the LATP (Li$_{1+x}$Al$_x$Ti$_{2-x}$(PO$_4$)$_3$) for the solid electrolyte. This powder was then evaluated using powder XRD. A diffraction peak indicative of a NASICON-type crystal structure was observed, and the powder was confirmed to be a single phase material.

Preparation of Positive Electrode Active Material (Comparative Example 1)

First, the starting materials Li$_2$CO$_3$, MnCO$_3$, and NH$_4$H$_2$PO$_4$ were mixed together in amounts appropriate for obtaining an oxide molar ratio of 0.5 Li$_2$O/1.0 MnCO$_3$/0.5 P$_2$O$_5$ and pre-fired at 850° C. in air to cause a solid phase reaction. The resulting powder was then crushed in a wet bead mill to a particle size distribution with D$_{50}$=1 μm as measured by laser diffraction. This powder was used as the positive electrode active material. This powder was then evaluated using powder XRD. A diffraction peak indicative of an olivine-type crystal structure was observed, and the powder was confirmed to be a single phase material.

Active Material-Solid Electrolyte Reactivity Evaluation 1—Powder Mixture Sintering Experiment (Comparative Example 1)

Ten grams each of the solid electrolyte and the positive electrode active material were combined with 100 g of an ethanol dispersion medium and 200 g of zirconia grinding media with φ=1.5 mm, and the mixture was agitated and mixed at 400 rpm for 5 minutes in a planetary ball mill. Next, the grinding media was separated from the slurry and the dispersion medium was evaporated, and the remaining material was ground in an automatic grinder to obtain a powder mixture. Of this powder mixture, 0.2 g was loaded into a metal mold with ⌀=10 mm without adding a binder or the like and compressed using a relatively weak force (by hand). This process was repeated to produce six powder mixture disks. These six powder mixture disks were then sintered in air at temperatures of 500° C., 550° C., 600° C., 650° C., 700° C., and 750° C., respectively.

Figure 7:
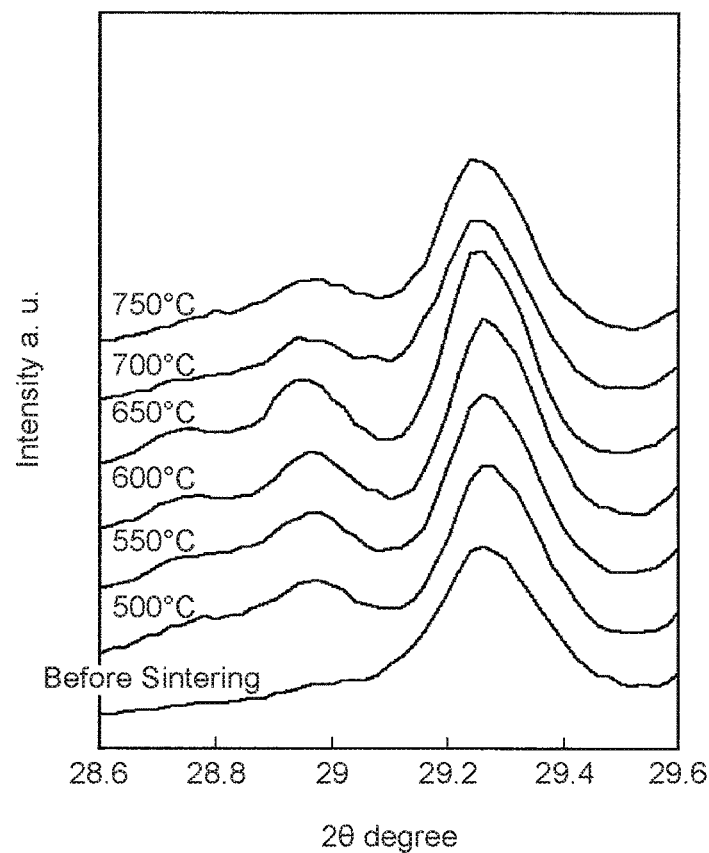
FIG. 7 is a graph showing the XRD measurement results for Comparative Example 1 (Mn/LATP=0).
Figure 9:
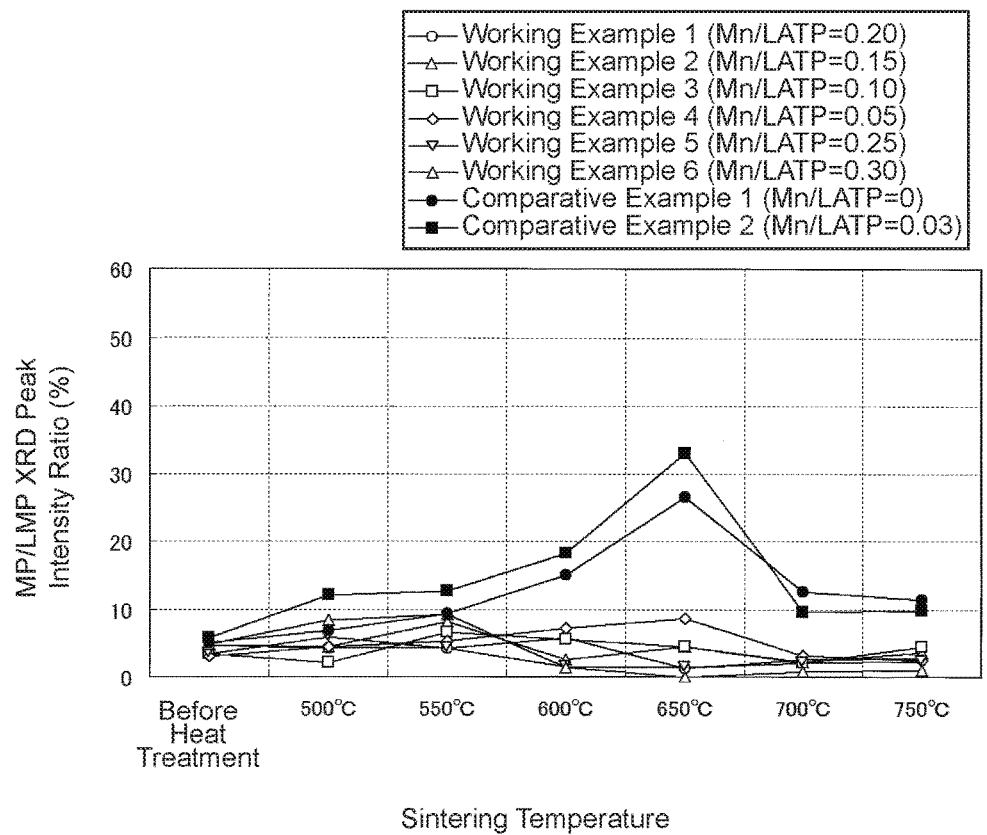
FIG. 9 is a graph showing the MP/LMP ratio (as a percentage) at each sintering temperature for each of the working examples and comparative examples.

After sintering, the disks were evaluated using X-ray diffraction (XRD). FIG. 7 shows the results. These sintered compacts were confirmed to contain Mn$_2$P$_2$O$_7$ (below, simply "MP"). FIG. 9 shows the changes in the ratio of MP/LMP according to the sintering temperature (the solid circles in FIG. 9). The MP/LMP ratio at 650° C. was 24.2%. This result indicates that diffusion of Li from the LiMnPO$_4$ to the solid electrolyte occurred up to a sintering temperature of 650° C.

Positive Electrode Active Material-Solid Electrolyte Reactivity Evaluation 2—Sintered Compact Interface Evaluation Experiment (Comparative Example 1)

The solid electrolyte and the LiMnPO$_4$ were each individually granulated using a PVA binder. These granules were loaded into a metal mold with ⌀=10 mm to form, in order, a solid electrolyte layer, an LiMnPO$_4$ layer, and another solid electrolyte layer, leveling off each layer as that layer was loaded. These layers were then pressure molded together at 2 MPa to form a multilayer green compact. Here, the thickness of the solid electrolyte layers was approximately 0.5 mm, and the thickness of the LiMnPO$_4$ layer was approximately 0.25 mm. This multilayer green compact was sintered at 850° C. in air to obtain a sintered compact for interface evaluation that included solid electrolyte layers and a LiMnPO$_4$ layer.

Figure 16A:
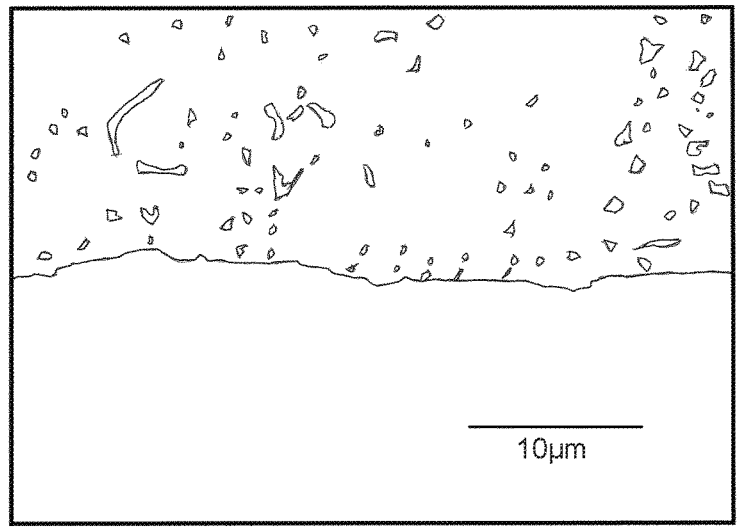
FIG. 16A is a scanning microscope image of the cross section of a sintered compact for interface evaluation produced in Comparative Example 1.
Figure 16B:
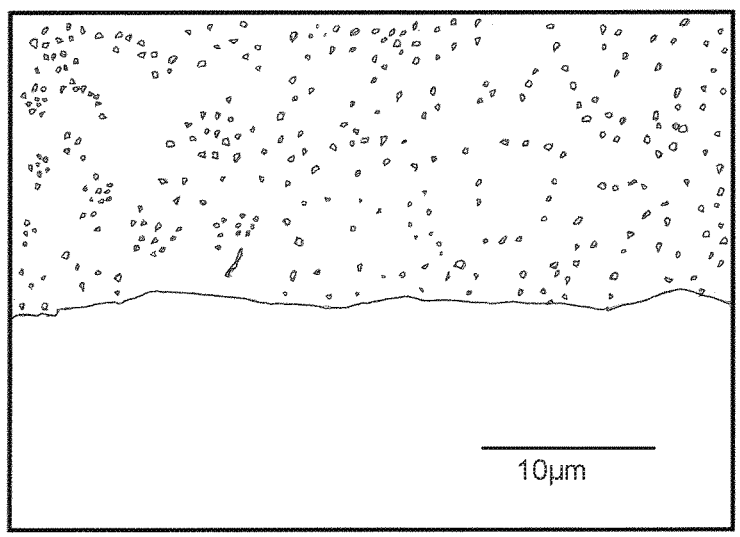
FIG. 16B is a Mn mapping image.

The cross section of this sintered compact was then examined using a scanning microscope. (Here, the cross section was taken through the center of the sintered compact and following a plane orthogonal to the interface. The cross sections of the sintered compacts examined using a scanning microscope in the other working examples and comparative examples below were taken in the same manner). FIG. 16A shows the observed image (a reflected electron image). FIG. 16B is a Mn mapping image. A large amount of an Mn compound was observed interspersed between the solid electrolyte grains, thereby confirming that manganese (Mn) had diffused from the LiMnPO$_4$ layer into the solid electrolyte layer. Given that the MP/LMP ratio begins to decrease at sintering temperatures higher than 650° C., it was concluded that at sintering temperatures of 500-650° C., lithium (Li) diffuses from the LiMnPO$_4$ into the solid electrolyte layer, forming Mn$_2$P$_2$O$_7$ at the interface between the LiMnPO$_4$ layer and the solid electrolyte layer. Furthermore, at higher sintering temperatures, Mn diffuses from the Mn$_2$P$_2$O$_7$ into the solid electrolyte layer.

Evaluation of Electrical Properties of Solid Electrolyte Sintered Compact (Comparative Example 1)

Green sheets were produced using the prepared solid electrolyte LATP and following the method below. The LATP was combined with a polyvinyl butyral binder, a plasticizer, toluene, ethanol, and a grinding media with $\varphi=1.5$ mm in a planetary ball mill and then mixed for 30 minutes at 400 rpm. Next, the grinding media was separated from the slurry, and the slurry was applied using doctor blading to a surface release-treated with a polyethylene terephthalate (PET) film. This assembly was placed on a 50° C. hot plate to dry to obtain green sheets 15 μm in thickness. The green sheets were separated from the PET film, layered together 10 layers thick, and sandwiched between two PET films and pre-pressed in a roll press at 50 kgf and 80° C. The pre-pressed multilayer sheet was then punched using a punch with ø=17 mm to obtain 10-layer disks. Four of these 10-layer disks were loaded into a pressing die with ø=17 mm and pressed at 10 MPa using a hydraulic press to obtain a 40-layer disk. The center of this 40-layer disk with ø=17 mm was punched out using a punch with ø=14 mm and then re-pressed in the hydraulic press at 5 MPa to obtain a multilayer disk. This multilayer disk was sintered at 850° C. in air to obtain a solid electrolyte sintered compact. This sintered compact was approximately 11 mm in diameter by 400 μm in thickness. Au electrodes were formed on both surfaces of the sintered compact using sputtering, and the electrochemical properties of the sintered compact were evaluated using AC impedance analysis. The measurements were performed in a 25° C. thermostatic chamber over a frequency range of 0.1 Hz to 500 kHz.

Upon evaluating the electrochemical properties using this method, the sintered compact was found to have a total ionic conductivity of $2.1 \times 10^{-4}$ S/cm.

Next, Comparative Example 3 will be described, in which cobalt (Co) was used for the transition metal M.

Comparative Example 3

LATP for the solid electrolyte was prepared the same as in Comparative Example 1. Furthermore, the positive electrode active material was prepared by replacing the manganese carbonate ($MnCO_3$) with cobalt acetate (($CH_3COO)_2Co$) as the source of the transition metal to synthesize $LiCoPO_4$. The rest of the preparation conditions for the positive electrode active material were the same as in Comparative Example 1.

Positive Electrode Active Material Layer-Solid Electrolyte Layer Reactivity Evaluation 2—Sintered Compact Interface Evaluation Experiment (Comparative Example 3)

Figure 20:
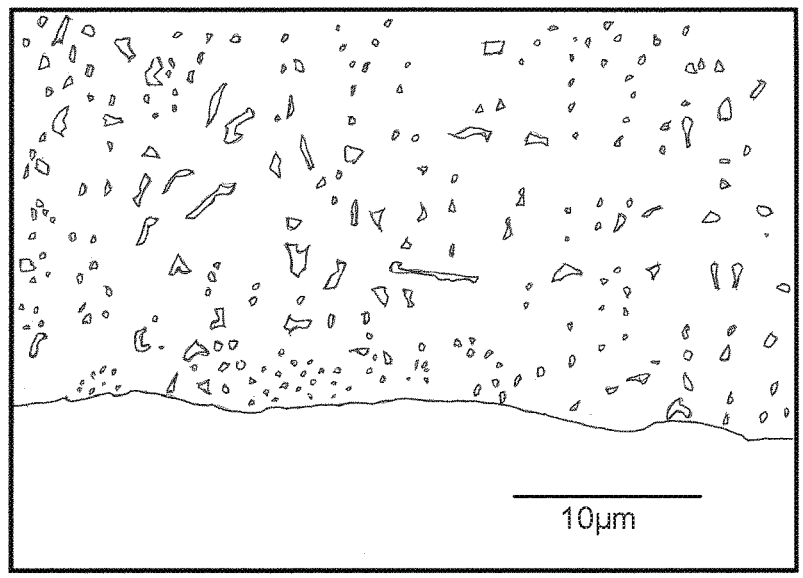
FIG. 20 is a scanning microscope image of the cross section of a sintered compact for interface evaluation produced in Comparative Example 3.

A sintered compact for interface evaluation was produced using the same method as in Comparative Example 1. The cross section of this sintered compact was then examined using a scanning microscope. FIG. 20 shows the observed image (a reflected electron image). Similar to in Comparative Example 1, a large amount of a Co compound was observed interspersed between the solid electrolyte grains, thereby confirming that Co had diffused from the $LiCoPO_4$ layer into the solid electrolyte layer.

Next, Comparative Example 4 will be described, in which nickel (Ni) was used for the transition metal M.

Comparative Example 4

LATP for the solid electrolyte was prepared the same as in Comparative Example 1. Furthermore, the positive electrode active material was prepared by replacing the manganese carbonate ($MnCO_3$) with nickel oxide (NiO) as the source of the transition metal and pre-fired at 800° C. to synthesize $LiNiPO_4$. The rest of the preparation conditions for the positive electrode active material were the same as in Comparative Example 1.

Positive Electrode Active Material Layer-Solid Electrolyte Layer Reactivity Evaluation 2—Sintered Compact Interface Evaluation Experiment (Comparative Example 4)

Figure 21:
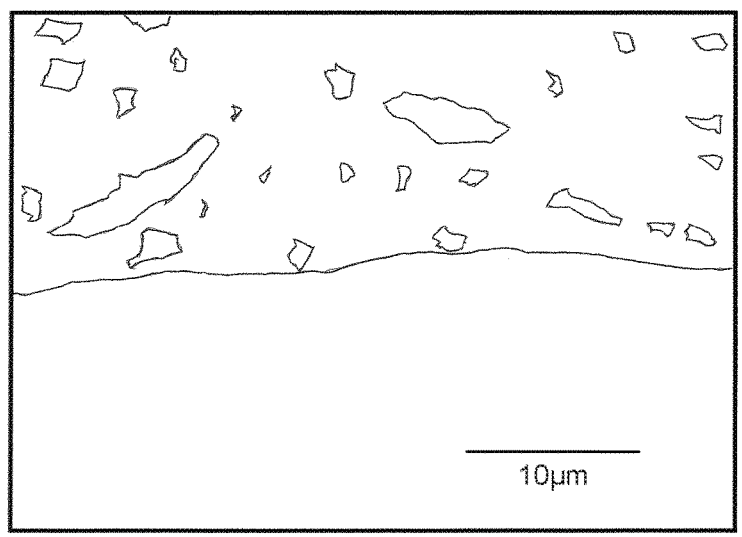
FIG. 21 is a scanning microscope image of the cross section of a sintered compact for interface evaluation produced in Comparative Example 4.

A sintered compact for interface evaluation was produced using the same method as in Comparative Example 1. The cross section of this sintered compact was then examined using a scanning microscope. FIG. 21 shows the observed image (a reflected electron image). Similar to in Comparative Example 1, a large amount of a Ni compound was observed interspersed between the solid electrolyte grains, thereby confirming that nickel (Ni) had diffused from the $LiNiPO_4$ layer into the solid electrolyte layer.

COMPARATIVE EXAMPLES 1, 3, and 4—Discussion and Findings

First, consider the XRD measurement results from the powder mixture sintering experiment shown in FIG. 7. In FIG. 7, the horizontal axis represents the 2θ angle, and the vertical axis represents intensity. In the measurement results in FIG. 7, two X-ray diffraction peaks are evident. The larger peak occurs around a 2θ angle of 29.25° and can be seen in all of the sintering conditions, both before sintering and at sintering temperatures of 500° C., 550° C., 600° C., 650° C., 700° C., and 750° C. The smaller peak occurs around a 2θ angle of 28.95°, cannot be seen before sintering, is strongly evident at sintering temperatures of 600° C. and 650°, and is weakly evident at sintering temperatures of 700° C. and 750° C.

Here, the peak near 29.25° corresponds to LMP (a lithium-manganese-phosphorous compound). Furthermore, the peak near 28.95° corresponds to MP (a compound that contains manganese and phosphorous: $Mn_2P_2O_7$). The graph in FIG. 7 makes several things clear. First, lithium migrates from the LMP active material to the solid electrolyte at low sintering temperatures. This migration of lithium (Li) from the LMP is what produces the MP. Second, an Li—P—O liquid phase is formed, and the transition metal M leaches into this liquid phase. Therefore, the amount of MP decreases at the higher sintering temperatures of 700° C. and 750° C.

These results are plotted in the graph in FIG. 9 (the solid circles), where the horizontal axis is sintering temperature and the vertical axis is the MP/LMP XRD peak intensity ratio.

These results make it clear that when the transition metal M is manganese (Mn), the mechanisms by which the transition metal M in the $LiMPO_4$ diffuses into a phosphate-type solid electrolyte layer are the diffusion of Li, formation of an Li—P—O liquid phase, and leaching of the transition metal M into the liquid phase, which occur in that order.

Sintered Compact Interface Evaluation Experiment

As described above, the sintered compact for interface evaluation in Comparative Example 1 was produced. The image of the cross section of this sintered compact as examined using a scanning microscope (the reflected electron image in FIG. 16A) and the Mn mapping image (FIG. 16B) revealed that manganese (Mn) was diffusing from the positive electrode active material layer to the solid electrolyte layer and could be seen as particles interspersed between the grain boundaries of the solid electrolyte layer.

Moreover, the transition element was observed to diffuse into the solid electrolyte layer in a similar manner both in Comparative Example 3 in which cobalt (Co) was used for the transition element and in Comparative Example 4 in which nickel (Ni) was used for the transition element. Therefore, the findings discussed above regarding the diffusion mechanism apply not only when using manganese (Mn) but also when using cobalt (Co) or nickel (Ni).

Composition of Solid Electrolyte that Inhibits Reaction, Completion of the Present Invention Based on the findings described above, the inventors found an optimal solid electrolyte composition for inhibiting this reaction, thereby arriving at the present invention (Working Examples 1 to 10). The specific configuration is as follows.

The solid electrolyte is a material that, when sintered at the same time as a phosphate type positive electrode active material, inhibits the diffusion of Li from the active material that occurs at 550-650° C.

Reducing this initial Li diffusion makes it possible to more effectively inhibit the diffusion of the transition metal that occurs at 650-750° C.

Furthermore, including the same transition metal used in the positive electrode active material in the solid electrolyte as well reduces the severity of the spatial concentration gradient of that element, thereby making it possible to inhibit diffusion of that element from the positive electrode active material to the solid electrolyte across a wide range of temperatures.

One such solid electrolyte is a NASICON-type phosphate that contains 0.05 moles or more of the transition metal element M for every 12 moles of O in the solid electrolyte. In the LATP ($Li_{1+x}Al_xTi_{2-x}(PO_4)_3$) material described above, the NASICON-type structure can be maintained at x values of 0 to approximately 0.8.

Furthermore, the inventors used this type of solid electrolyte layer to produce an all-solid-state secondary battery, evaluated the performance, and confirmed that the battery indeed functioned satisfactorily as an all-solid-state secondary battery.

The inventors also produced a multilayer all-solid-state secondary battery and verified the performance thereof.

Process for Adding the Transition Metal Element M to the Solid Electrolyte

To add the transition element M to the LATP, manganese carbonate (a carbonate of manganese (Mn)) is added while synthesizing the LATP, and the resulting mixture is synthesized (pre-fired) to produce Mn-containing LATP. Sintered compacts for interface evaluation can be produced as follows. The Mn-containing LATP is mixed together with a binder, an organic solvent, and a plasticizer to form a slurry. This slurry is then applied to PET film to form a green sheet (an unsintered film), the positive electrode active material layer is layered on top, and then the entire assembly is sintered at the same time (main sintering process).

Alternatively, instead of adding manganese while synthesizing the LATP, manganese oxide (an oxide of manganese) may be added while forming the LATP slurry after synthesizing the LATP, and the resulting slurry may then be applied to a film, layered, and sintered. In this case, manganese oxide is added instead of manganese carbonate in order to avoid creation of carbon dioxide gas during the main sintering process.

In summary, the transition metal element M may be added at any time before the main sintering process, and it does not matter whether the transition metal element M is added before or after synthesizing the LATP. This applies not only when using manganese (Mn) but also when using cobalt (Co) or nickel (Ni) for the transition element M.

Effects of Additive During Main Sintering Process, State and Structure of Material after Main Sintering Process The transition element added to the LATP is dispersed uniformly throughout the entire solid electrolyte layer. As the temperature increases during the main sintering process, the added transition element solid-dissolves into the crystal grains of the LATP, which have a NASICON-type crystal structure. Furthermore, the transition element in excess of the solubility limit becomes a second-phase particulate precipitate that is interspersed throughout the solid electrolyte layer. This second-phase particulate precipitate is likely formed at the grain boundaries.

The second-phase particulate precipitate interspersed throughout the solid electrolyte layer has an olivine-type crystal structure (the interspersed material in Comparative Examples 1, 3, and 4 is $Mn_2P_2O_7$ and can readily be identified as such). In addition, this transition element is the same transition element used in the positive electrode active material. Therefore, the transition metal serves to reduce the severity of the compositional gradient between the positive electrode active material layer and the solid electrolyte layer.

The transition element also prevents diffusion in the following ways. First, the presence of the added transition element that solid-dissolves into the LATP prevents the lithium (Li) and the transition element in the positive electrode active material layer from solid-dissolving and diffusing into the solid electrolyte layer. Second, the presence of the added transition element in excess of the solubility limit that takes a particulate precipitate form (with an olivine-type crystal structure) prevents the lithium (Li) and the transition element in the positive electrode active material layer from diffusing into the solid electrolyte layer along the grain boundaries thereof. Third, sintering the solid electrolyte layer and the positive electrode active material layer together at the same time and the abovementioned relaxation of the compositional gradient result in a close interface bond and prevent the lithium (Li) and the transition element M near the interface between the positive electrode active material layer and the solid electrolyte layer from precipitating out (that is, prevents the unfavorable creation of a second phase).

Moreover, the amounts of the transition element M that do solid-dissolve or become interspersed as a particulate precipitate do not interfere with the passage of $Li^+$ ions through the NASICON-type structure (recall that conducting lithium ions is the intended function of the solid electrolyte layer).

Area Ratio and Particle Size of Olivine-Type Precipitate in Cross Section of Solid Electrolyte Layer The mapping image of the transition element in the cross section of each solid electrolyte layer of various aspects of the present invention was digitized, and the ratio of the area of the cross section of the solid electrolyte layer occupied by the olivine-type precipitate was calculated. It was found that a satisfactory range for this area ratio was 0.3% to 16%.

Moreover, the particle size of the olivine-type precipitate was found to be less than or equal to 10 μm when measured using an image (a reflected electron image) from a scanning electron microscope (SEM).

Particle size was quantified by taking the particle size of the single largest particle observed in each SEM image. Particle sizes in the SEM image were measured as follows. A cross section of the sample to measure (here, the solid electrolyte layer described above) was prepared. This sample was then fixed to a sample stage for the SEM using an acrylic resin containing particles of carbon black dispersed throughout.

With the SEM set to a magnification of 10,000×, 10 reflected electron images were taken at random locations in the cross section. To measure the particle sizes, the Feret diameter of each particle was measured. More specifically, the length of the two sides of a rectangle circumscribing a particle and the length of the two sides of another rectangle circumscribing the particle and inclined at 45° to the first rectangle were measured, and the lengths of these four sides were averaged to calculate the size of each particle. From this data, the size of the largest particle in each image was extracted, and the average value of these 10 largest particles was calculated.

Terminology and Concepts in the Present Invention

In the present invention, "all-solid-state secondary battery" refers to a secondary battery in which a solid electrolyte is used instead of a liquid electrolyte.

The solid electrolyte is a NASICON-type phosphate containing a transition metal M. Here, the transition metal M is the same element as the transition metal M contained in the olivine-type positive electrode active material. The transition metal M is at least one element of manganese (Mn), cobalt (Co), and nickel (Ni).

The NASICON-type phosphate used for the solid electrolyte can be written using the general formula $AB_2(PO_4)_3$. Here, the A site is occupied by lithium (Li). Examples of single elements that can occupy the B site include titanium (Ti), germanium (Ge), and zirconium (Zr). Aluminum (Al) is trivalent, not quadrivalent, and therefore by including 0.3 moles of aluminum (Al) and 1.7 moles of titanium (Ti) in the B site, for example, the amount of lithium (Li) in the A site can be increased to 1.3 moles. This makes it possible to increase the ionic conductivity of the material.

One preferable composition for the NASICON-type phosphate used for the solid electrolyte is $Li_{1+x}Al_xTi_{2-x}(PO_4)_3$. In the present specification, this composition is referred to as LATP. Here, x must have a value of 0 to approximately 0.8 in order to maintain the NASICON-type structure.

In the present specification, an LATP composition that contains a transition metal M is referred to as M-LATP. A manganese (Mn)-containing composition is written as Mn-LATP, a cobalt (Co)-containing composition is written as Co-LATP, and a nickel (Ni)-containing composition is written as Ni-LATP.

Here, "contains a transition metal M" means that enough of the transition metal M is added that the maximum amount of the transition metal M that can solid-dissolve into the NASICON-type structure does so and the transition metal M in excess of the solubility limit precipitates out as a particulate compound interspersed uniformly throughout the entire solid electrolyte layer. Although the solid-dissolved transition metal M could potentially be included as part of the elemental composition of the solid electrolyte, the notation M-LATP is used to indicate that both solid solution and precipitate forms of the transition metal M are present.

Here, "NASICON-type structure" refers to a crystal structure in which $MO_6$ octahedra (where M is a transition metal) that share vertices with $XO_4$ tetrahedra (here, X is phosphorous (P)) are arranged three-dimensionally.

"Olivine-type positive electrode active material" refers to $LiMPO_4$ (where the transition metal M is manganese (Mn), cobalt (Co), or nickel (Ni)), which has an olivine-type crystal structure.

"Olivine-type crystal structure" refers to a crystal structure similar to that of the mineral olivine, which has a hexagonal, close-packed oxygen structure.

"Active material" refers to a material that plays a central role in the battery reaction by undergoing a redox reaction in which the material loses and gains electrons.

"Forming a slurry" refers to mixing a material with a binder, an organic solvent, and a plasticizer to form a liquid.

"Sintering" refers to the process of sintering the solid electrolyte layer and the positive electrode active material layer together at the same time.

"Sintered compact" refers to a ceramic sintered compact obtained from the sintering process.

"Diffusion" refers to dispersion and migration of the lithium (Li) and the transition element M due to heat during sintering.

"Solid-dissolve" refers to a process by which atoms of a different element enter the crystal structure of a metal, producing a solid-state solution in which the original crystal structure is unchanged.

"Solubility limit" refers to the maximum amount of the other element that can enter the crystal structure while still maintaining a solid solution.

"Precipitation" refers to a phenomenon in which, above the solubility limit, a new phase (a precipitate) that has a crystal structure different from the original crystal structure of the solid solution (parent phase) begins to appear in that parent phase.

"Grain boundaries" refers to the joints between individual crystal grains.

"Phase" refers to a physical state with uniform composition and physical properties.

"Second phase" refers to a new phase that appears in the parent phase.

Experiments with M=Mn

First, several experiments in which manganese (Mn) was used for the transition element M will be described.

Working Example 1

Preparation of Solid Electrolyte

First, the starting materials $Li_2CO_3$, $\alpha$-$Al_2O_3$, anatase $TiO_2$, $MnCO_3$, and $NH_4H_2PO_4$ were mixed together in amounts appropriate for obtaining an oxide molar ratio of 0.65 LiO/0.15 $Al_2O_3$/1.7 $TiO_2$/0.2 $MnCO_3$/1.5 $P_2O_5$ and pre-fired at 850° C. in air to cause a solid phase reaction. The resulting powder 2 was then crushed in a wet bead mill to a particle size distribution with $D_{50}$=1 μm as measured by laser diffraction. This powder 2 was used as the Mn-LATP for the solid electrolyte. This powder was then evaluated using powder XRD. A diffraction peak indicative of a NASICON-type crystal structure was observed, and the powder was confirmed to be a single phase material.

Preparation of Positive Electrode Active Material

First, the starting materials $Li_2CO_3$, $MnCO_3$, and $NH_4H_2PO_4$ were mixed together in amounts appropriate for obtaining an oxide molar ratio of 0.5 $Li_2O$/1.0 $MnCO_3$/0.5 $P_2O_5$ and pre-fired at 850° C. in air to cause a solid phase reaction. The resulting powder was then crushed in a wet bead mill to a particle size distribution with $D_{50}$=1 μm as measured by laser diffraction. This powder was used as the positive electrode active material. This powder was then evaluated using powder XRD. A diffraction peak indicative of an olivine-type crystal structure was observed, and the powder was confirmed to be a single phase material.

Active Material-Solid Electrolyte Reactivity Evaluation 1—Powder Mixture Sintering Experiment Ten grams each of the solid electrolyte and the positive electrode active material were combined with 100 g of an ethanol dispersion medium and 200 g of zirconia grinding media with φ=1.5 mm, and the mixture was agitated and mixed at 400 rpm for 5 minutes in a planetary ball mill. Next, the grinding media was separated from the slurry and the dispersion medium was evaporated, and the remaining material was ground in an automatic grinder to obtain a powder mixture. Of this powder mixture, 0.2 g was loaded into a metal mold with ø=10 mm without adding a binder or the like and compressed using a relatively weak force (by hand). This process was repeated to produce six powder mixture disks. These disks were then sintered in air at temperatures of 500° C., 550° C., 600° C., 650° C., 700° C., and 750° C., respectively. The sintered disks were then crushed and powdered using an agate mortar and pestle and evaluated using powder XRD. No reduction in the intensity of the $LiMnPO_4$ and Mn-LATP (the starting materials) diffraction peaks was observed for any of the sintering temperatures, suggesting that diffusion of elements from the $LiMPO_4$ to the Mn-LATP had been inhibited. The ratio of the intensity of the $Mn_2P_2O_7$ diffraction peak near 28.9° to the intensity of the $LiMnPO_4$ diffraction peak near 29.3° (as a percentage, below, this value will be referred to simply as the "MP/LMP ratio") was calculated from the XRD measurement results shown in FIG. 1 for the powders sintered at each temperature. The changes in this MP/LMP ratio were then plotted in FIG. 9 (the hollow circles). The MP/LMP ratio at 650° C. was 1.3%. This suggests that although a small amount of lithium (Li) diffused from the $LiMnPO_4$ to the solid electrolyte and appeared as second-phase $Mn_2P_2O_7$, adding the manganese (Mn) to the LATP effectively inhibited this Li diffusion.

Figure 10A:
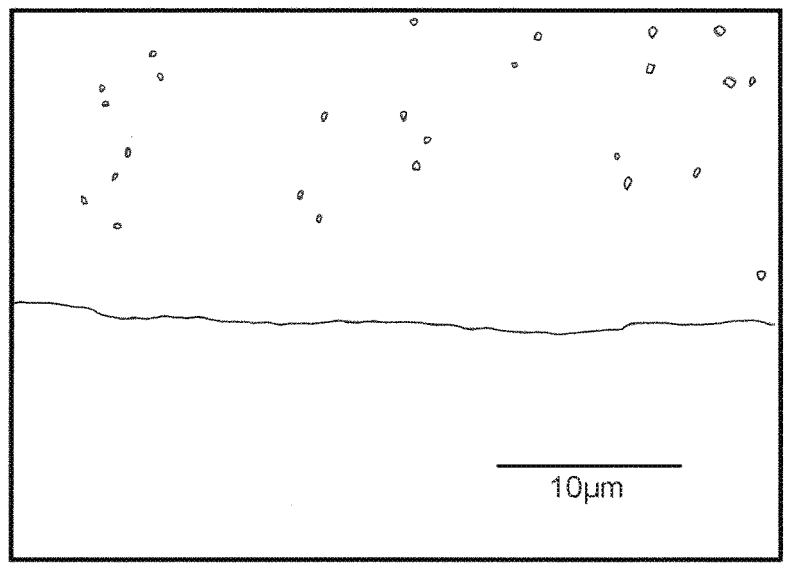
FIG. 10A is a scanning microscope image of a cross section taken along the diameter of a disk-shaped sintered compact for interface evaluation (below, simply "the cross section") produced in Working Example 1.

Active Material-Solid Electrolyte Reactivity Evaluation 2—Sintered Compact Interface Evaluation Experiment The solid electrolyte and the $LiMnPO_4$ were each individually granulated using a PVA binder. These granules were loaded into metal mold with ø=10 mm to form, in order, a solid electrolyte layer, an $LiMnPO_4$ layer, and another solid electrolyte layer, leveling off each layer as that layer was loaded. These layers were then pressure molded together at 2 MPa to form a multilayer green compact. Here, the thickness of the solid electrolyte layers was approximately 0.5 mm, and the thickness of the $LiMnPO_4$ layer was approximately 0.25 mm. This multilayer green compact was sintered at 850° C. in air to obtain a sintered compact containing the solid electrolyte and the $LiMnPO_4$. This sintered compact disk was then cut along the diameter thereof, and the revealed cross section was examined using a scanning microscope. FIG. 10A shows the observed image (a reflected electron image). No traces of reaction between the solid electrolyte layer and the $LiMnPO_4$ layer were observed. Therefore, an EDS compositional analysis was performed to obtain a compositional mapping of the manganese (Mn). No diffusion of any of the elements or segregation resulting from such diffusion were seen. In the Mn mapping image shown in FIG. 10B (the small particle-shaped areas are locations where manganese (Mn) is present), no diffusion of manganese (Mn) to the LATP side (the upper side) is apparent. Although segregated regions with different contrast are visible in the solid electrolyte layer, further XRD analysis revealed a weak peak originating from second-phase $LiMnPO_4$ that was not seen in the powder XRD. This second-phase $LiMnPO_4$ likely precipitated out during the sintering process, and the fact that the same weak peak can be seen when the solid electrolyte material is sintered by itself confirms that this peak is not indicative of segregation due to diffusion of Mn from the $LiMnPO_4$.

Evaluation of Electrical Properties of Solid Electrolyte Sintered Compact

Green sheets were produced using the solid electrolyte Mn-LATP prepared in Working Example 1 and following the method below. The Mn-LATP was combined with a polyvinyl butyral binder, a plasticizer, toluene, ethanol, and a grinding media with φ=1.5 mm in a planetary ball mill and then mixed for 30 minutes at 400 rpm. Next, the grinding media was separated from the slurry, and the slurry was applied using doctor blading to a surface release-treated with a polyethylene terephthalate (PET) film. This assembly was placed on a 50° C. hot plate to dry to obtain green sheets 15 μm in thickness. The green sheets were separated from the PET film, layered together 10 layers thick, and sandwiched between two PET films and pre-pressed in a roll press at 50 kgf and 80° C. The pre-pressed multilayer was then punched using a punch with ø=17 mm to obtain 10-layer disks. Four of these 10-layer disks were loaded into a pressing die with ø=17 mm and pressed at 10 MPa using a hydraulic press to obtain a 40-layer disk. The center of this 40-layer disk with ø=17 mm was punched out using a punch with ø=14 mm and then re-pressed in the hydraulic press at 5 MPa to obtain a multilayer disk. This multilayer disk was sintered at 850° C. in air to obtain a solid electrolyte sintered compact. This sintered compact was approximately 11 mm in diameter by 400 μm in thickness. Au electrodes were formed on both surfaces of the sintered compact using sputtering, and the electrochemical properties of the sintered compact were evaluated using AC impedance analysis. The measurements were performed in a 25° C. thermostatic chamber over a frequency range of 0.1 Hz to 500 kHz. The sintered compact was found to have a total ionic conductivity of $5.0 \times 10^{-4}$ S/cm.

Working Example 2

The same experiments as in Working Example 1 were performed; however, the number of moles of manganese carbonate ($MnCO_3$) added during preparation of the solid electrolyte was changed from 0.2 to 0.15.

Figure 2:
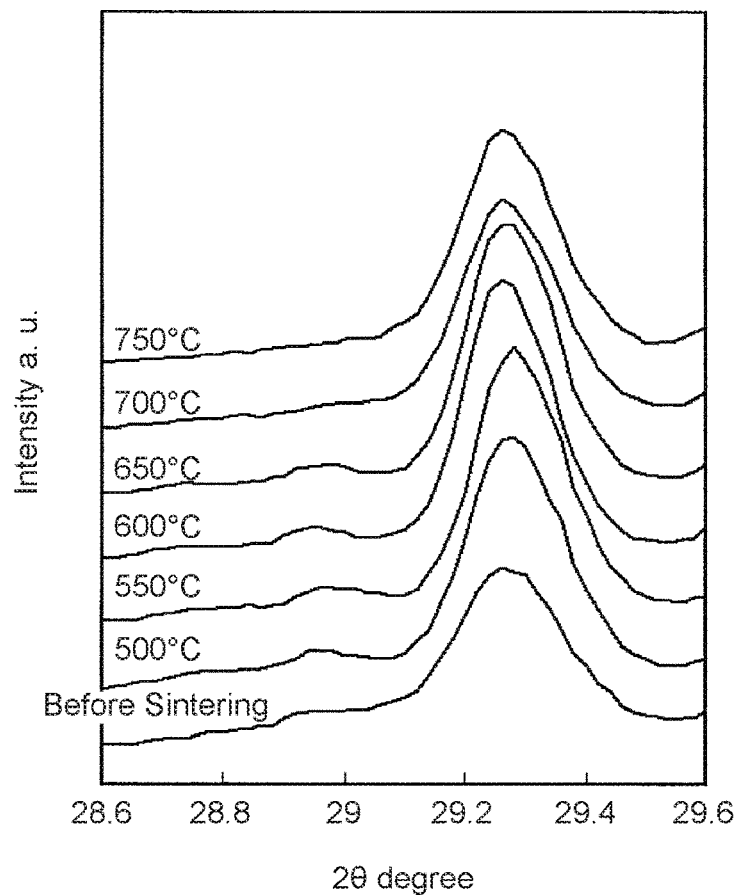
FIG. 2 is a graph showing the XRD measurement results for Working Example 2 (Mn/LATP=0.15).

Positive Electrode Active Material-Solid Electrolyte Reactivity Evaluation 1—Powder Mixture Sintering Experiment Powder mixture disks were produced and sintered using the same method as in Working Example 1. FIG. 2 shows the results of the XRD analysis after sintering. FIG. 9 shows the changes in MP/LMP ratio (the hollow triangles). The MP/LMP ratio at 650° C. was 4.5%.

Figure 11:
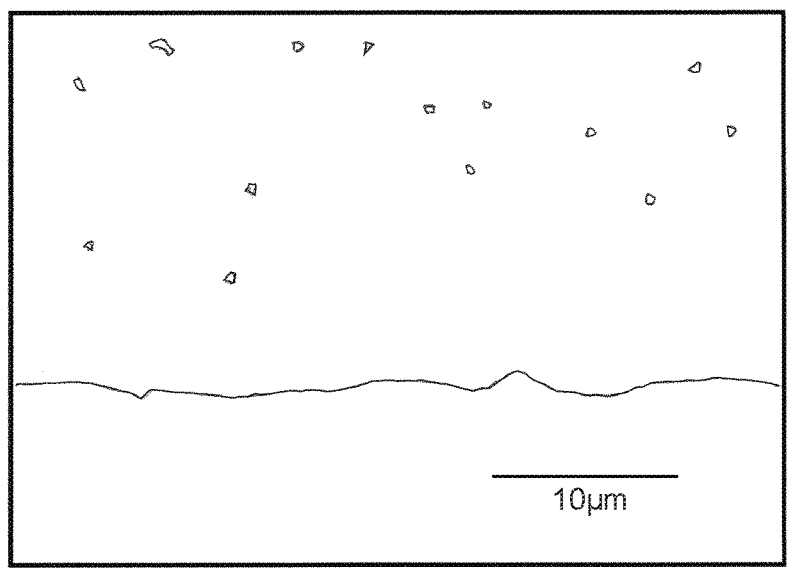
FIG. 11 is a scanning microscope image of the cross section of a sintered compact for interface evaluation produced in Working Example 2.

Positive Electrode Active Material-Solid Electrolyte Reactivity Evaluation 2—Sintered Compact Interface Evaluation Experiment A sintered compact for interface evaluation was produced using the same method as in Working Example 1. The cross section of this sintered compact was then examined using a scanning microscope. FIG. 11 shows the observed image (a reflected electron image). No traces of reaction between the solid electrolyte layer and the $LiMnPO_4$ layer were observed.

Evaluation of Electrical Properties of Solid Electrolyte Sintered Compact

Upon evaluating the electrochemical properties of the sintered compact using the same method as in Working Example 1, the total ionic conductivity was found to be $3.9 \times 10^{-4}$ S/cm.

Working Example 3

The same experiments as in Working Example 1 were performed; however, the number of moles of manganese carbonate ($MnCO_3$) added during preparation of the solid electrolyte was changed from 0.2 to 0.1.

Figure 3:
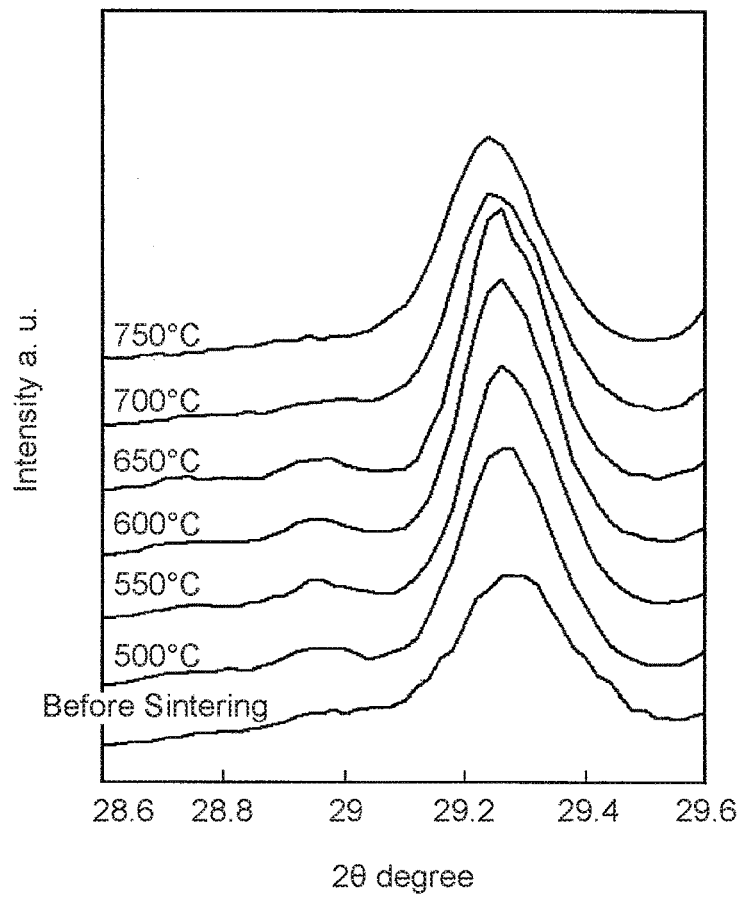
FIG. 3 is a graph showing the XRD measurement results for Working Example 3 (Mn/LATP=0.10).

Positive Electrode Active Material-Solid Electrolyte Reactivity Evaluation 1—Powder Mixture Sintering Experiment Powder mixture disks were produced and sintered using the same method as in Working Example 1. FIG. 3 shows the results of the XRD analysis after sintering. FIG. 9 shows the changes in MP/LMP ratio (the hollow squares). The MP/LMP ratio at 650° C. was 4.5%.

Figure 12:
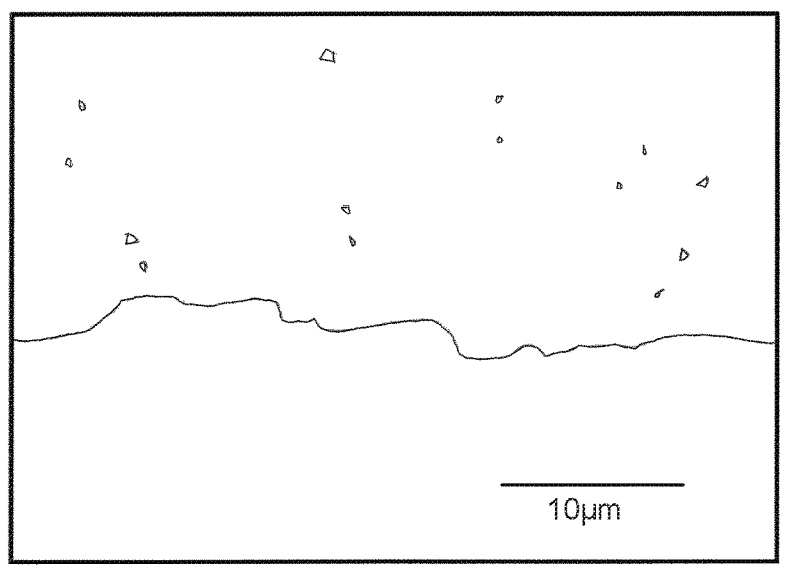
FIG. 12 is a scanning microscope image of the cross section of a sintered compact for interface evaluation produced in Working Example 3.

Positive Electrode Active Material-Solid Electrolyte Reactivity Evaluation 2—Sintered Compact Interface Evaluation Experiment A sintered compact for interface evaluation was produced using the same method as in Working Example 1. The cross section of this sintered compact was then examined using a scanning microscope. FIG. 12 shows the observed image (a reflected electron image). No traces of reaction between the solid electrolyte layer and the $LiMnPO_4$ layer were observed.

Evaluation of Electrical Properties of Solid Electrolyte Sintered Compact

Upon evaluating the electrochemical properties of the sintered compact using the same method as in Working Example 1, the total ionic conductivity was found to be $3.1 \times 10^{-4}$ S/cm.

Working Example 4

The same experiments as in Working Example 1 were performed; however, the number of moles of manganese carbonate ($MnCO_3$) added during preparation of the solid electrolyte was changed from 0.2 to 0.05.

Figure 4:
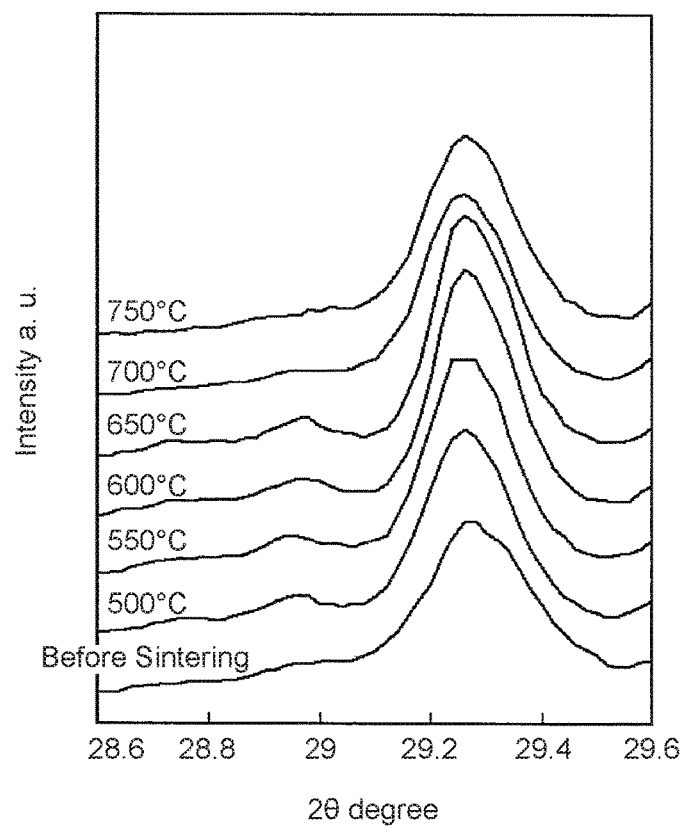
FIG. 4 is a graph showing the XRD measurement results for Working Example 4 (Mn/LATP=0.05).

Positive Electrode Active Material-Solid Electrolyte Reactivity Evaluation 1—Powder Mixture Sintering Experiment Powder mixture disks were produced and sintered using the same method as in Working Example 1. FIG. 4 shows the results of the XRD analysis after sintering. FIG. 9 shows the changes in MP/LMP ratio (the hollow diamonds). The MP/LMP ratio at 650° C. was 8.7%.

Figure 13:
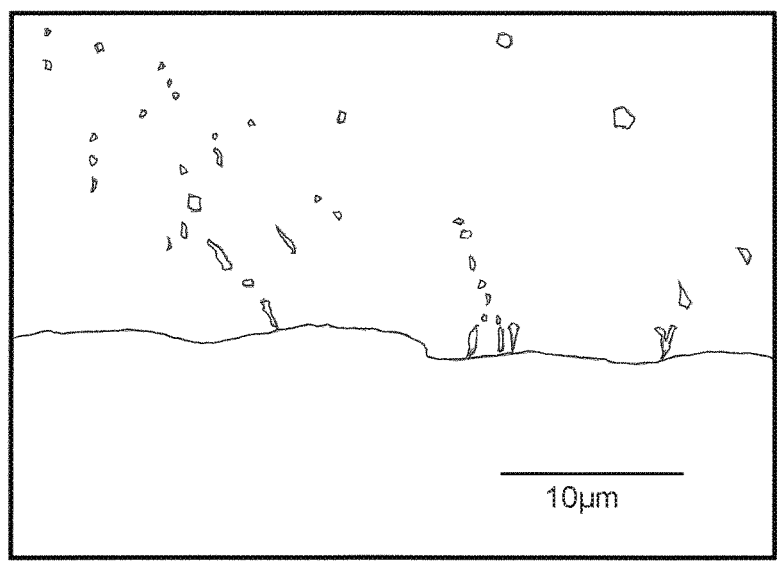
FIG. 13 is a scanning microscope image of the cross section of a sintered compact for interface evaluation produced in Working Example 4.

Positive Electrode Active Material-Solid Electrolyte Reactivity Evaluation 2—Sintered Compact Interface Evaluation Experiment A sintered compact for interface evaluation was produced using the same method as in Working Example 1. The cross section of this sintered compact was then examined using a scanning microscope. FIG. 13 shows the observed image (a reflected electron image). No traces of reaction between the solid electrolyte layer and the $LiMnPO_4$ layer were observed.

Evaluation of Electrical Properties of Solid Electrolyte Sintered Compact

Upon evaluating the electrochemical properties of the sintered compact using the same method as in Working Example 1, the total ionic conductivity was found to be $2.3 \times 10^{-4}$ S/cm.

Working Example 5

The same experiments as in Working Example 1 were performed; however, the number of moles of manganese carbonate ($MnCO_3$) added during preparation of the solid electrolyte was changed from 0.2 to 0.25.

Figure 5:
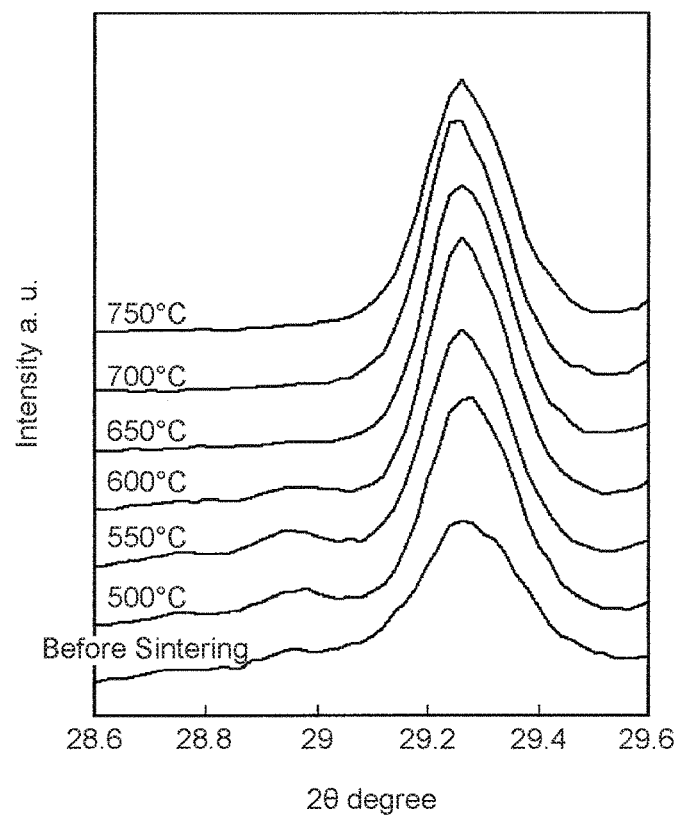
FIG. 5 is a graph showing the XRD measurement results for Working Example 5 (Mn/LATP=0.25).

Positive Electrode Active Material-Solid Electrolyte Reactivity Evaluation 1—Powder Mixture Sintering Experiment Powder mixture disks were produced and sintered using the same method as in Working Example 1. FIG. 5 shows the results of the XRD analysis after sintering. FIG. 9 shows the changes in MP/LMP ratio (the hollow upside-down triangles). The MP/LMP ratio at 650° C. was 1.4%.

Figure 14:
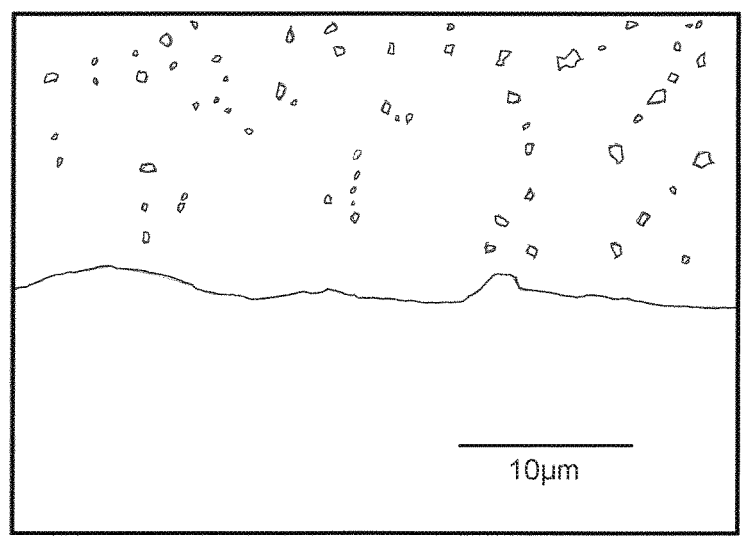
FIG. 14 is a scanning microscope image of the cross section of a sintered compact for interface evaluation produced in Working Example 5.

Positive Electrode Active Material-Solid Electrolyte Reactivity Evaluation 2—Sintered Compact Interface Evaluation Experiment A sintered compact for interface evaluation was produced using the same method as in Working Example 1. The cross section of this sintered compact was then examined using a scanning microscope. FIG. 14 shows the observed image (a reflected electron image). No traces of reaction between the solid electrolyte layer and the $LiMnPO_4$ layer were observed. However, the number of segregated $LiMnPO_4$ areas in the solid electrolyte layer was greater than in Working Example 1.

Evaluation of Electrical Properties of Solid
Electrolyte Sintered Compact

Upon evaluating the electrochemical properties of the sintered compact using the same method as in Working Example 1, the total ionic conductivity was found to be $3.4 \times 10^{-4}$ S/cm.

Working Example 6

The same experiments as in Working Example 1 were performed; however, the number of moles of $MnCO_3$ added during preparation of the solid electrolyte was changed from 0.2 to 0.3. XRD analysis of the solid electrolyte Mn-LATP revealed diffraction peaks belonging to second-phase $LiTiPO_5$ and $LiMnPO_4$.

Figure 6:
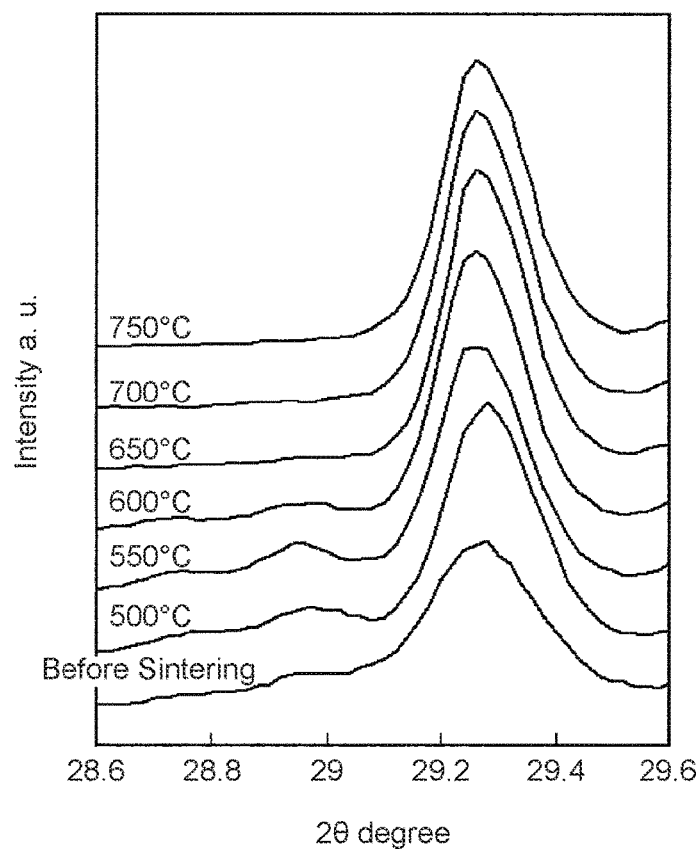
FIG. 6 is a graph showing the XRD measurement results for Working Example 6 (Mn/LATP=0.30).

Positive Electrode Active Material-Solid Electrolyte
Reactivity Evaluation 1—Powder Mixture Sintering
Experiment Powder mixture disks were produced and sintered using the same method as in Working Example 1. FIG. 6 shows the results of the XRD analysis after sintering. FIG. 9 shows the changes in MP/LMP ratio (the hollow triangles). The MP/LMP ratio at 650° C. was 0.0%.

Figure 15:
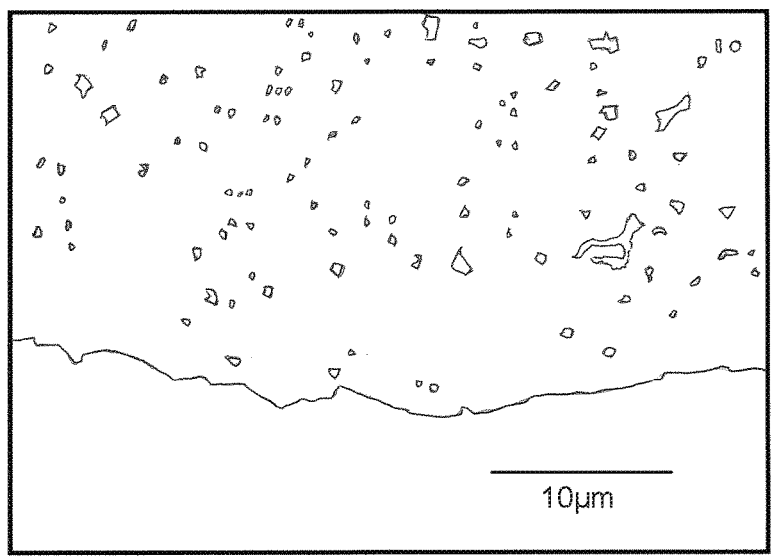
FIG. 15 is a scanning microscope image of the cross section of a sintered compact for interface evaluation produced in Working Example 6.

Positive Electrode Active Material-Solid Electrolyte
Reactivity Evaluation 2—Sintered Compact
Interface Evaluation Experiment A sintered compact for interface evaluation was produced using the same method as in Working Example 1. The cross section of this sintered compact was then examined using a scanning microscope. FIG. 15 shows the observed image (a reflected electron image). No traces of reaction between the solid electrolyte layer and the $LiMnPO_4$ layer were observed. However, the number of segregated $LiMnPO_4$ areas in the solid electrolyte was greater than in Working Example 5.

Evaluation of Electrical Properties of Solid
Electrolyte Sintered Compact

Upon evaluating the electrochemical properties of the sintered compact using the same method as in Working Example 1, the total ionic conductivity was found to be $1.8 \times 10^{-4}$ S/cm.

Although the reaction between the $LiMnPO_4$ and the LATP was inhibited like in the other working examples, the ionic conductivity decreased slightly. This was likely due to an increased amount of impurities, an increased amount of segregated LiMnPO4 areas, and a decrease in sinterability.

Comparative Examples 1 to 4

Comparative Examples 1, 3, and 4 have already been described. These experiments were performed in order to characterize the diffusion mechanism as part of the findings of the present invention.

Here, simply note that Comparative Examples 1, 3, and 4 yielded data useful for comparison with the working examples. Comparative Example 1 has already been described in detail and will not be addressed again here. However, as this is the first time Comparative Example 2 has been mentioned, this new comparative example will be described below.

Comparative Example 2

The same experiments as in Working Example 1 were performed; however, the number of moles of manganese carbonate ($MnCO_3$) added during preparation of the solid electrolyte was changed from 0.2 to 0.03.

Figure 8:
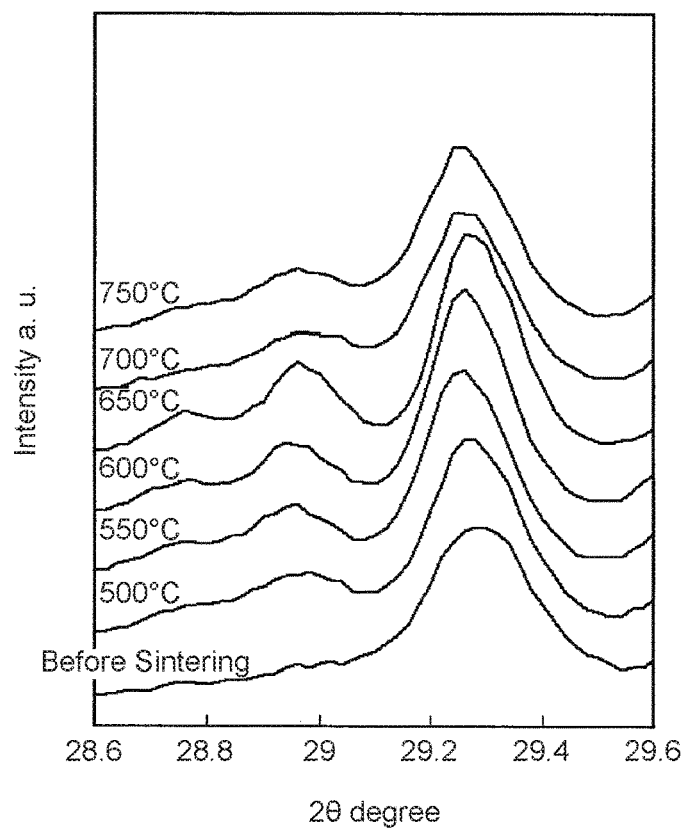
FIG. 8 is a graph showing the XRD measurement results for Comparative Example 2 (Mn/LATP=0.03).

Positive Electrode Active Material-Solid Electrolyte
Reactivity Evaluation 1—Powder Mixture Sintering
Experiment Powder mixture disks were produced and sintered using the same method as in Working Example 1. FIG. 8 shows the results of the XRD analysis after sintering. FIG. 9 shows the changes in MP/LMP ratio (the solid squares). The MP/LMP ratio at 650° C. was 33.0%. This result indicates that diffusion of elements from the $LiMnPO_4$ layer to the solid electrolyte occurred up to a sintering temperature of 650° C., suggesting that adding the Mn had no effect.

Figure 17:
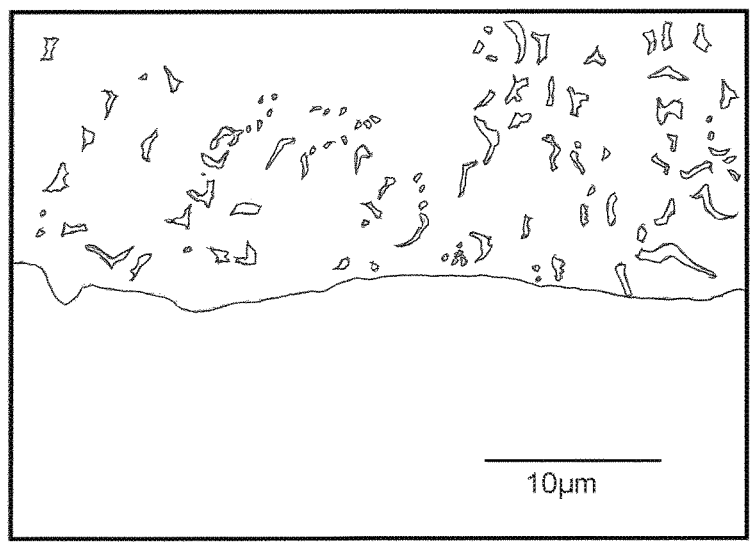
FIG. 17 is a scanning microscope image of the cross section of a sintered compact for interface evaluation produced in Comparative Example 2.

Positive Electrode Active Material-Solid Electrolyte
Reactivity Evaluation 2—Sintered Compact
Interface Evaluation Experiment A sintered compact for interface evaluation was produced using the same method as in Working Example 1. The cross section of this sintered compact was then examined using a scanning microscope. FIG. 17 shows the observed image (a reflected electron image). Similar to in Comparative Example 1, a large amount of a Mn compound was observed interspersed between the solid electrolyte grains, thereby confirming that Mn had diffused from the $LiMnPO_4$ layer into the solid electrolyte layer.

Evaluation of Electrical Properties of Solid
Electrolyte Sintered Compact

Upon evaluating the electrochemical properties of the sintered compact using the same method as in Working Example 1, the total ionic conductivity was found to be $2.1 \times 10^{-4}$ S/cm.

Amount of Manganese (Mn) Added and Area Ratio
of Interspersed Olivine (%)

In each of Working Examples 1 to 6, the element mapping image of the cross section (as taken through the center of the sintered compact and following a plane orthogonal to the interface between the positive electrode active material layer and the solid electrolyte layer) of the respective sintered compact as captured using a scanning microscope was digitized using a computer. The area of the interspersed olivine (that is, the precipitate having an olivine-type crystal structure) was measured, and the ratio of the area occupied by the interspersed olivine in the overall solid electrolyte layer was calculated. The results are plotted in the graph in FIG. 23. Moreover, the table in FIG. 22 summarizes the results of Working Examples 1 to 8 and Comparative Examples 1 to 4.

Figure 23:
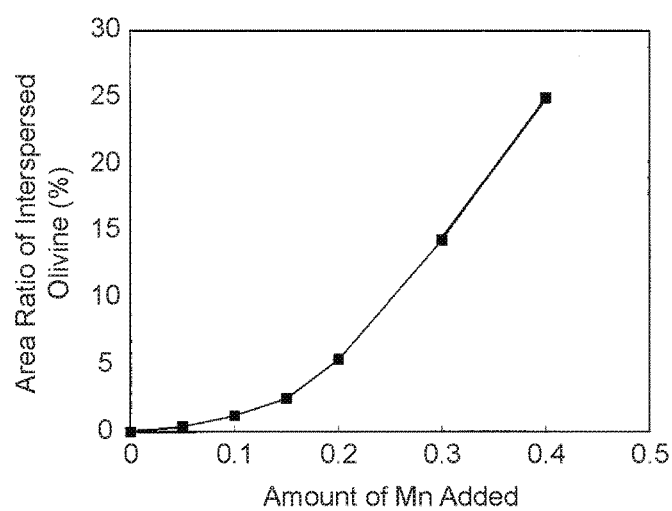
FIG. 23 is a graph showing the relationship between the amount of Mn added and the area ratio of interspersed olivine-type material.

As shown in FIG. 23, the area ratio of the interspersed olivine increases monotonically according to the amount of Mn added. Furthermore, the amounts of Mn added that resulted in a good state at the interface between the layers in the sintered compact interface evaluation experiment ranged from 0.05-0.3 moles, with the corresponding olivine area ratios ranging from 0.3-16%.

Moreover, the amounts of Mn added that resulted in preferable electrical properties (total ionic conductivity) ranged from 0.1-0.25 moles, with the corresponding olivine area ratios ranging from 0.6-10%.

Figure 10B:
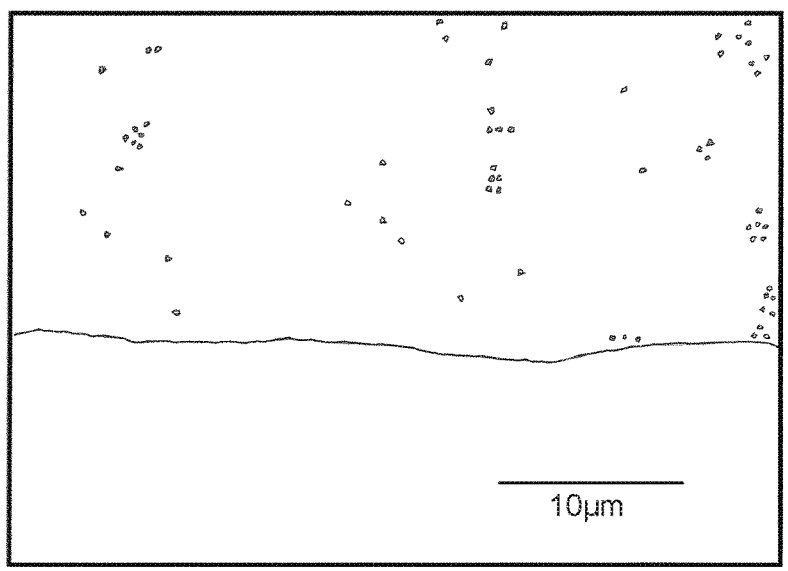
FIG. 10B is a Mn mapping image.

FIGS. 10A to 21 are all images taken using a scanning microscope (except for FIGS. 10B and 16B, which are Mn mapping images). In each of these figures, the line running horizontally through the centers of the figure (the almost-straight curved line) is the interface between the solid electrolyte layer and the positive electrode active material layer. The portion above the interface is the solid electrolyte layer, and the portion below the interface is the positive electrode active material layer. The particle-shaped regions in the SEM images are olivine-type precipitates in the working examples and are $Mn_2PO_7$ precipitates in the comparative examples.

Experiments with M=Co, Ni

Next, Working Examples 7 and 8 and Comparative Examples 3 and 4 will be described, in which cobalt (Co) and nickel (Ni) were used instead of manganese (Mn) as the transition element M.

Working Example 7

The solid electrolyte was prepared the same as in Working Example 1 except in that $(CH_3COO)_2Co$ was used instead of $MnCO_3$ (the number of moles of the transition metal added was not changed) to produce a Co-LATP solid electrolyte. Furthermore, the positive electrode active material was prepared the same as in Working Example 1 except in that the $MnCO_3$ was replaced with $(CH_3COO)_2Co$ as the source of the transition metal to synthesize $LiCoPO_4$ for use as the positive electrode active material.

Figure 18:
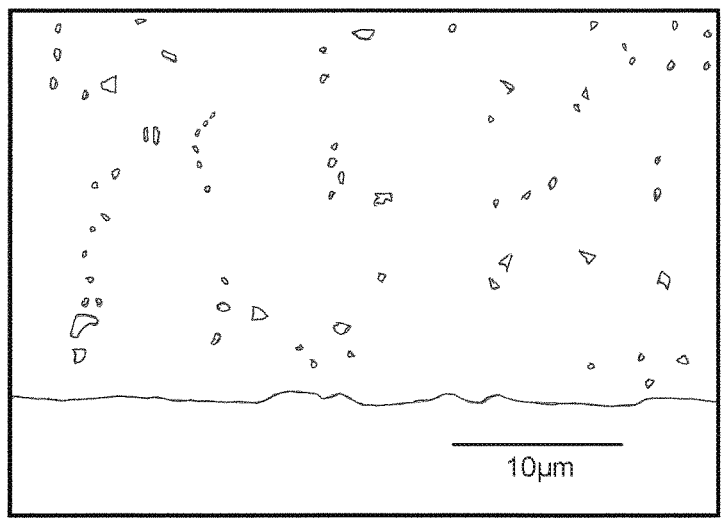
FIG. 18 is a scanning microscope image of the cross section of a sintered compact for interface evaluation produced in Working Example 7.

Positive Electrode Active Material-Solid Electrolyte Reactivity Evaluation 2—Sintered Compact Interface Evaluation Experiment A sintered compact for interface evaluation was produced using the same method as in Working Example 1 except in that Co-LATP was used for the solid electrolyte and $LiCoPO_4$ was used for the active material. The cross section of this sintered compact was then examined using a scanning microscope. FIG. 18 shows the observed image (a reflected electron image). No traces of reaction between the solid electrolyte layer and the $LiCoPO_4$ layer were observed.

Evaluation of Electrical Properties of Solid Electrolyte Sintered Compact

Upon evaluating the electrochemical properties of the sintered compact using the same method as in Working Example 1, the total ionic conductivity was found to be $5.2 \times 10^{-4}$ S/cm.

Working Example 8

The solid electrolyte was prepared the same as in Working Example 1 except in that NiO was used instead of $MnCO_3$ (the number of moles of the transition metal added was not changed). Furthermore, the positive electrode active material was prepared the same as in Working Example 1 except in that the $MnCO_3$ was replaced with NiO as the source of the transition metal, and the resulting mixture was pre-fired at 800° C. to synthesize $LiNiPO_4$ for use as the positive electrode active material.

Figure 19:
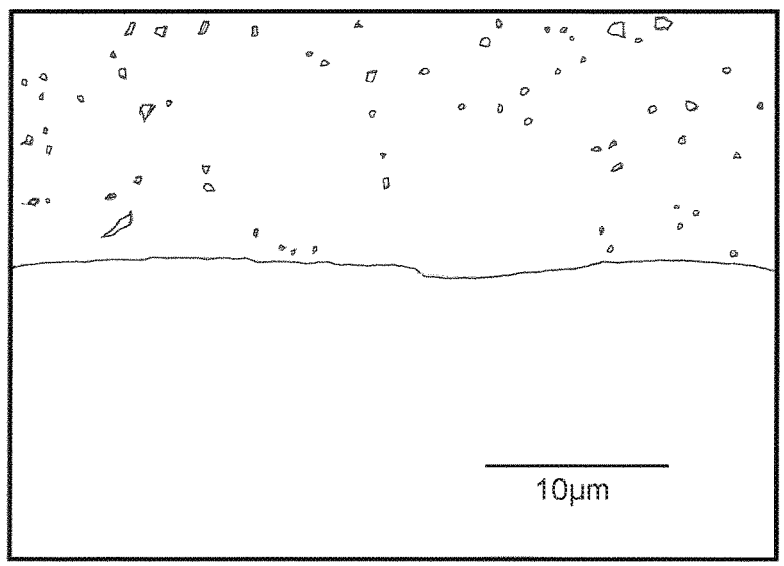
FIG. 19 is a scanning microscope image of the cross section of a sintered compact for interface evaluation produced in Working Example 8.

Positive Electrode Active Material-Solid Electrolyte Reactivity Evaluation 2—Sintered Compact Interface Evaluation Experiment A sintered compact for interface evaluation was produced using the same method as in Working Example 1 except in that Ni-LATP was used for the solid electrolyte and $LiNiPO_4$ was used for the active material. The cross section of this sintered compact was then examined using a scanning microscope. FIG. 19 shows the observed image (a reflected electron image). No traces of reaction between the solid electrolyte layer and the $LiNiPO_4$ layer were observed.

Evaluation of Electrical Properties of Solid Electrolyte Sintered Compact

Upon evaluating the electrochemical properties of the sintered compact using the same method as in Working Example 1, the total ionic conductivity was found to be $2.4 \times 10^{-4}$ S/cm. One reason why the total ionic conductivity was lower than in Working Examples 1 and 7 may be that the sinterability of $LiNiPO_4$ at 850° C. decreased slightly in the present working example, as evidenced by the electron microscope image.

Comparative Example 3

The same experiment as in Working Example 7 was performed; however, cobalt acetate $((CH_3COO)_2Co)$ was not used during preparation of the solid electrolyte.

Active Material-Solid Electrolyte Reactivity Evaluation 2—Sintered Compact Interface Evaluation Experiment A sintered compact for interface evaluation was produced using the same method as in Working Example 1. The cross section of this sintered compact was then examined using a scanning microscope. FIG. 20 shows the observed image (a reflected electron image). Similar to in Comparative Example 1, a large amount of a Co compound was observed interspersed between the solid electrolyte grains, thereby confirming that Co had diffused from the $LiCoPO_4$ layer into the solid electrolyte layer.

Comparative Example 4

The same experiment as in Working Example 8 was performed; however, nickel oxide (NiO) was not used during preparation of the solid electrolyte.

Active Material-Solid Electrolyte Reactivity Evaluation 2—Sintered Compact Interface Evaluation Experiment A sintered compact for interface evaluation was produced using the same method as in Working Example 1. The cross section of this sintered compact was then examined using a scanning microscope. FIG. 21 shows the observed image (a reflected electron image). Similar to in Comparative Example 1, a large amount of a Ni compound was observed interspersed between the solid electrolyte grains, thereby confirming that Ni had diffused from the LiNiPO$_4$ layer into the solid electrolyte layer.

Working Example 9

Production and Performance Evaluation of Disk-Shaped All-Solid Secondary Battery (1) Experiments on Half-Cell with Metallic Lithium Negative Electrode A disk-shaped all-solid-state secondary battery was assembled using the LiCoPO$_4$ positive electrode active material and the Co-LATP solid electrolyte prepared in Working Example 7 and a metallic lithium negative electrode. During production of a multilayer green sheet using the same method as in <Evaluation of Electrical Properties of Solid Electrolyte Sintered Compact>, a composite paste of LiCoPO$_4$, Co-LATP, and palladium (Pd) was screen printed on the uppermost surface of the disk, and then on top of that layer a Pd paste was screen printed to complete the green sheet. This disk was then sintered at 850° C. in air to produce a sintered disk having positive electrode layers. This sintered disk was approximately 12 mm in diameter and 400 μm in thickness. Upon examining the cross section of the disk and measuring the thickness of the layers, the positive electrode active material layers were found to have a thickness of approximately 2 μm.

A polymer electrolyte containing polyethylene oxide and LiTFSI was formed on the lowermost surface of the disk, and a metallic lithium foil was then applied to this lowermost surface in a glovebox filled with an Ar atmosphere. The resulting assembly was then sealed inside a 2032 coin cell. The electrochemical properties of this coin cell were then measured.

Figure 26:
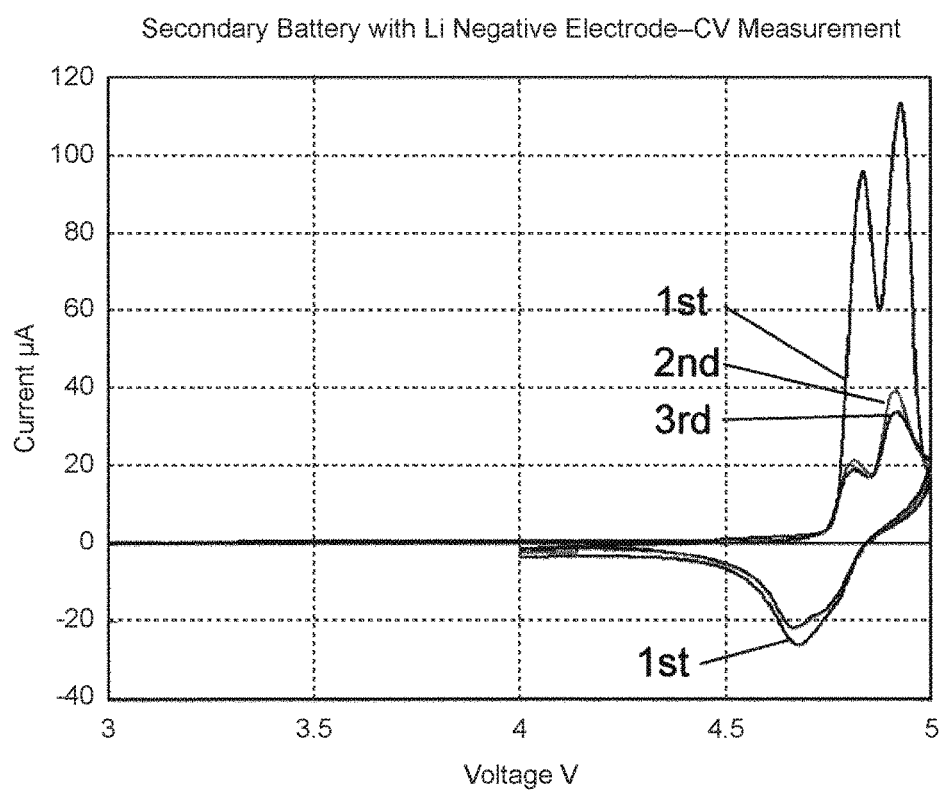
FIG. 26 is a cyclic voltammogram of a disk-shaped all-solid-state secondary battery (a half-cell with a metallic lithium negative electrode).

First, a cyclic voltammetry (below, simply "CV") measurement from 4V-5V was performed at 80° C. and using a sweep rate of 0.2 mV/sec. FIG. 26 is a cyclic voltammogram showing the measurement results. During the first cycle, two delithiation peaks were observed near 4.8-4.9V, and one lithiation peak was observed near 4.7V. This makes it clear that the LiCoPO$_4$ positive electrode active material was functioning as intended. A large irreversible capacity was observed in the first cycle. The second and third cycles traced approximately the same curves and exhibited improved coulombic efficiency. The charge/discharge capacities were calculated from the CV measurement. The charge/discharge capacities were 25.4 μAh and 10 μAh, respectively, for the first cycle, 10 μAh and 7.3 μAh for the second cycle, and 9.6 μAh and 7.2 μAh for the third cycle.

Figure 27:
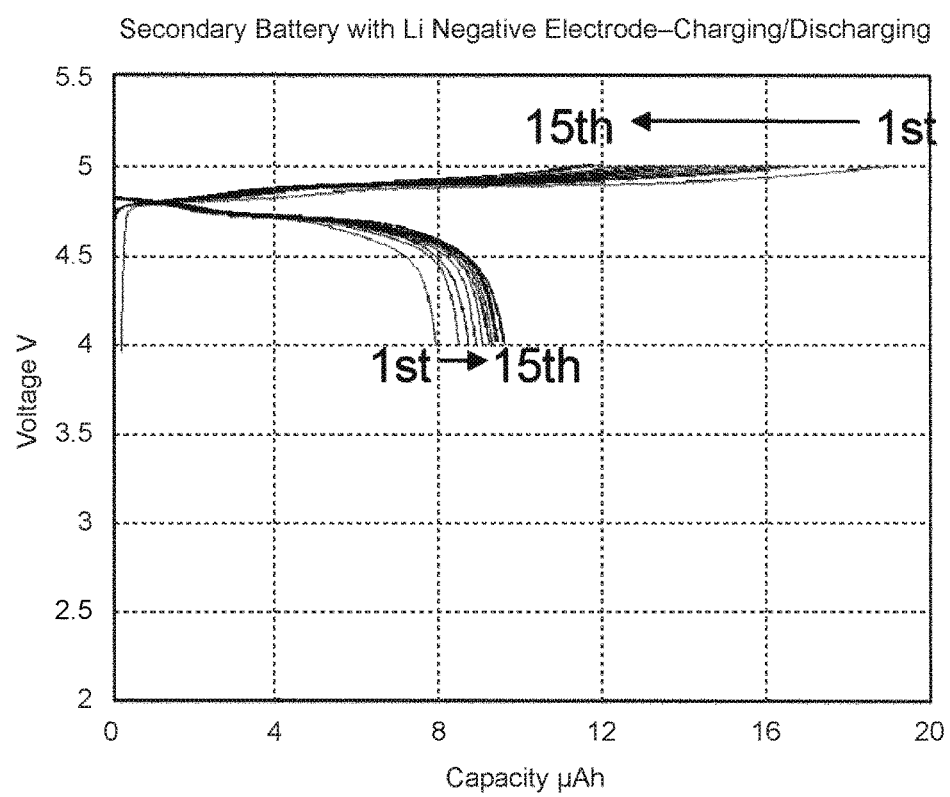
FIG. 27 is a graph showing the charge/discharge curves of a disk-shaped all-solid-state secondary battery (a half-cell with a metallic lithium negative electrode).

Next, a charging/discharging test was performed at 80° C. The cell was charged at a constant current of 20 μA to a final voltage of 5V. The cell was discharged at a constant current of 4 μA to a final voltage of 4V. FIG. 27 shows the charge/discharge curves obtained from the measurement results. The charging/discharging test was repeated for 15 cycles. The discharge capacity was approximately 9 μAh, and no significant decrease in capacity was seen by the 15th cycle. This suggests that using LiCoPO$_4$ for the positive electrode active material layer, Co-LATP for the solid electrolyte layer, and metallic lithium for the negative electrode active material layer makes it possible to produce a 4.8V all-solid-state battery.

(2) All-Solid Secondary Battery with Co-LATP Negative Electrode Active Material (Distinct Negative Electrode Active Material not Used)

A disk-shaped all-solid-state secondary battery was assembled using the LiCoPO$_4$ positive electrode active material and the Co-LATP solid electrolyte prepared in Working Example 7. During production of a multilayer green sheet using the same method as in <Evaluation of Electrical Properties of Solid Electrolyte Sintered Compact>, a composite paste of LiCoPO$_4$, Co-LATP, and Pd was screen printed on the uppermost surface of the disk, and then on top of that layer a Pd paste was screen printed to complete the green sheet. The Pd paste was also screen printed on the lowermost surface of the green sheet. This disk was then sintered at 850° C. in air to produce a disk-shaped all-solid-state secondary battery. This sintered disk was approximately 12 mm in diameter and 400 μm in thickness. Upon examining the cross section of the disk and measuring the thickness of the layers, the positive electrode active material layers were found to have a thickness of approximately 2 μm.

This disk-shaped all-solid-state secondary battery was then sealed inside a 2032 coin cell in a glovebox filled with an Ar atmosphere, and the electrochemical properties of the coin cell were measured.

Figure 28:
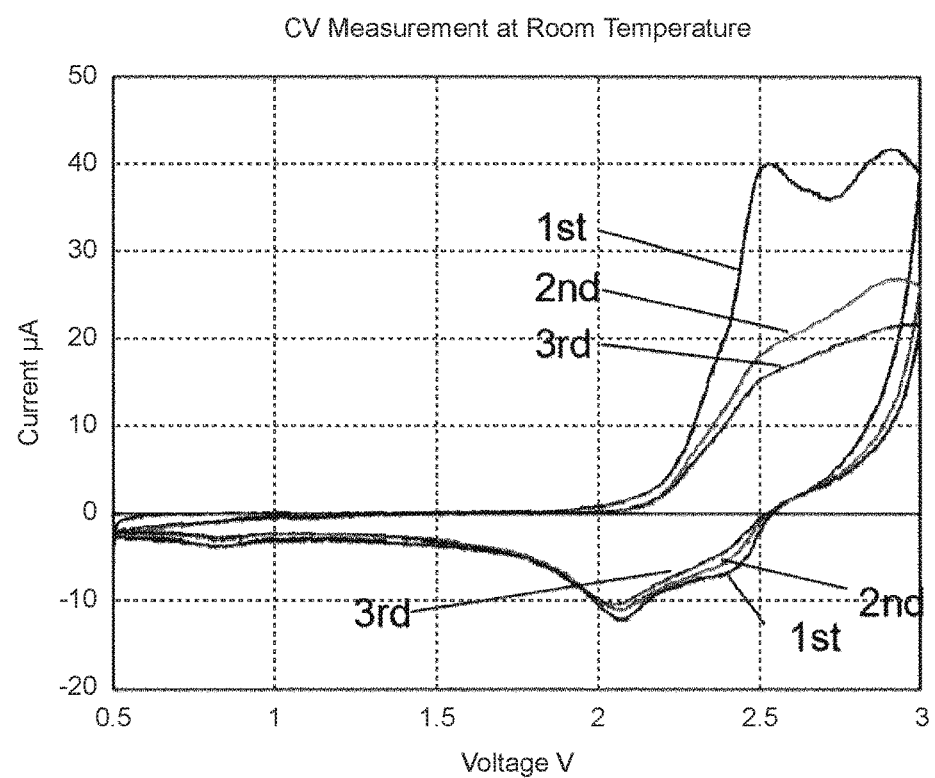
FIG. 28 is a cyclic voltammogram (taken at room temperature) of an all-solid-state secondary battery in which Co-LATP is also used as the negative electrode active material.
Figure 29:
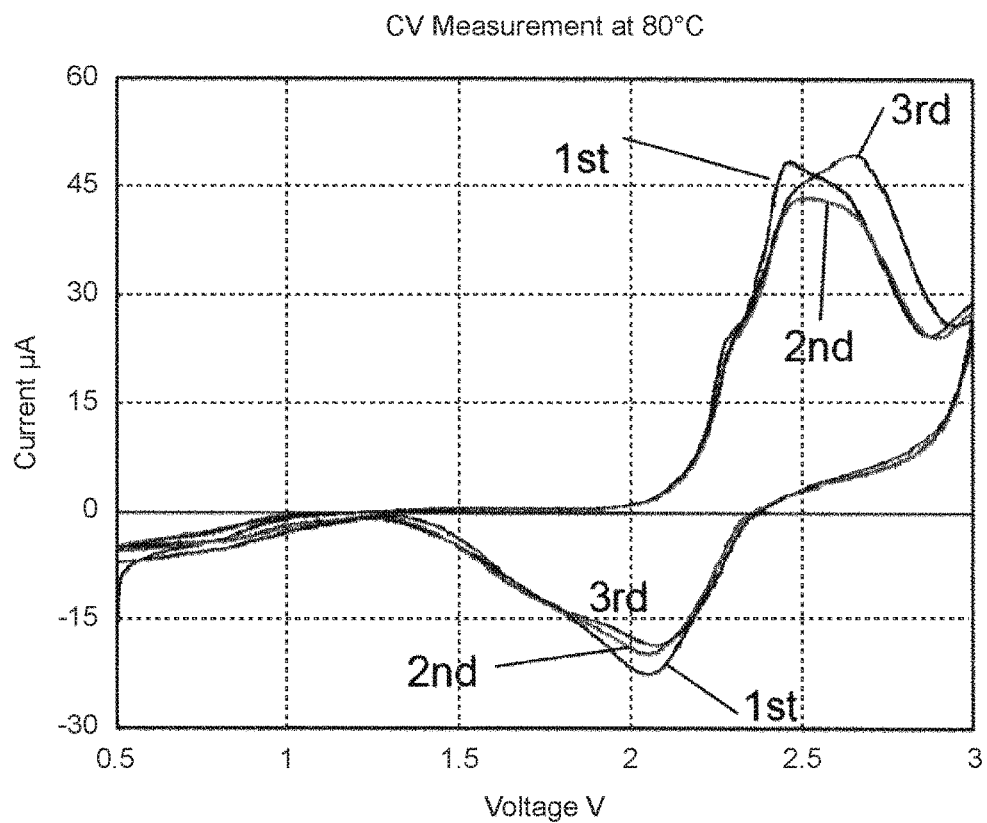
FIG. 29 is a cyclic voltammogram (taken at 80° C.) of an all-solid-state secondary battery in which Co-LATP is also used as the negative electrode active material.
Figure 30:
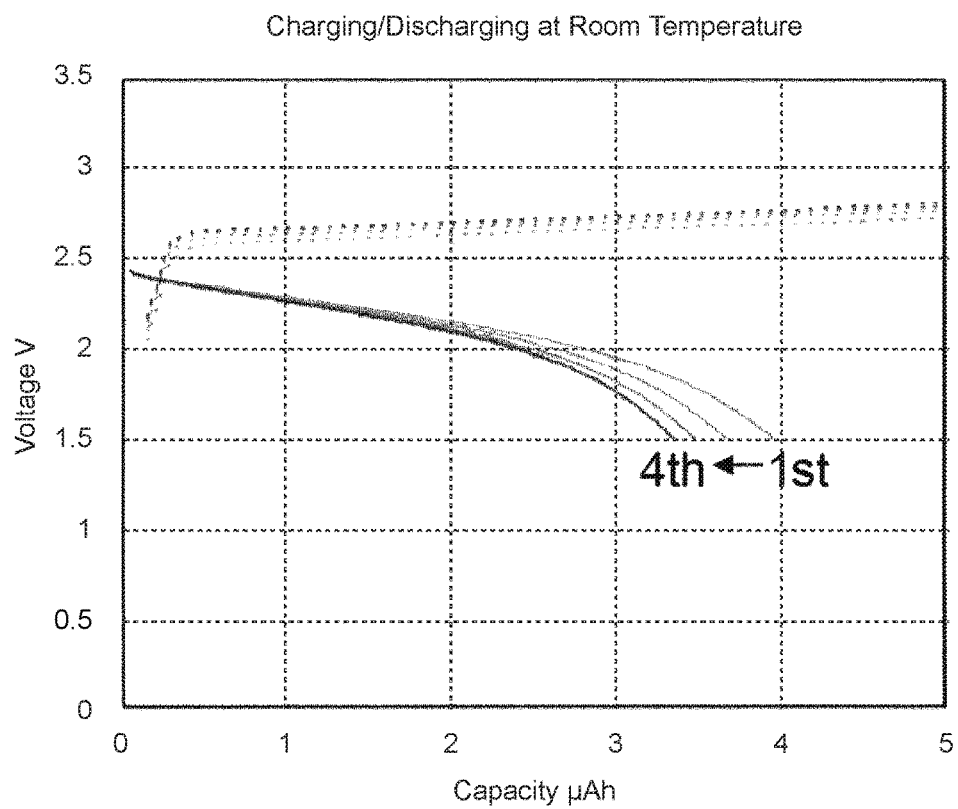
FIG. 30 is a graph showing the charge/discharge curves (at room temperature) of an all-solid-state secondary battery in which Co-LATP is also used as the negative electrode active material.
Figure 31:
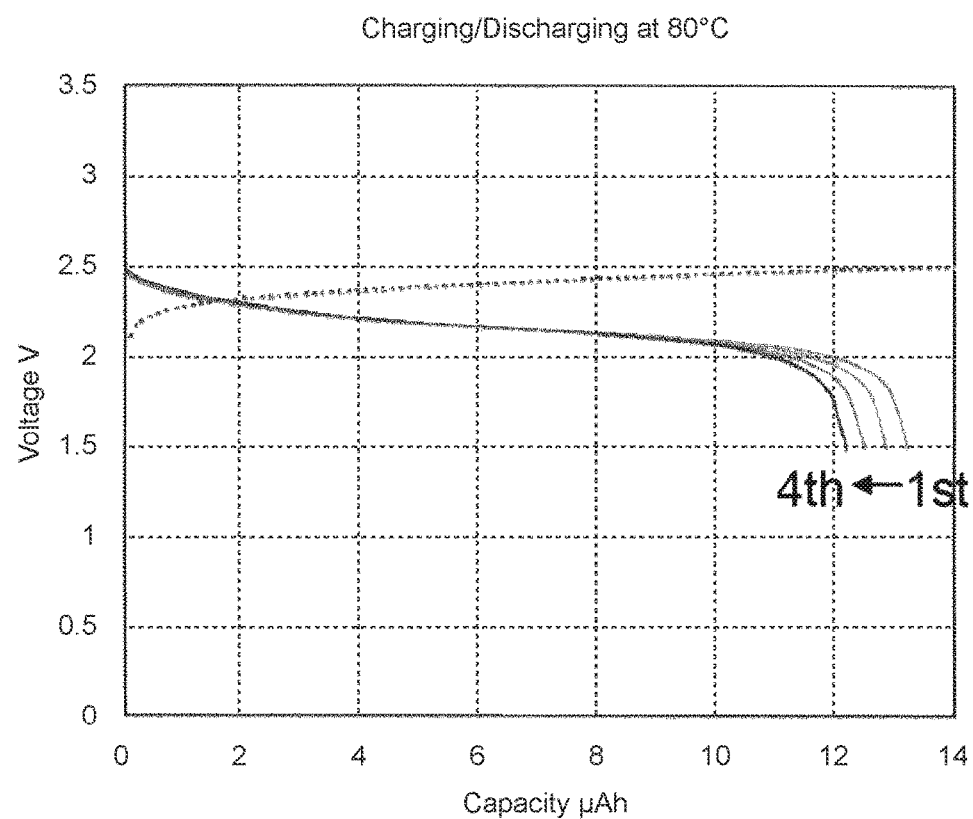
FIG. 31 is a graph showing the charge/discharge curves (at 80° C.) of an all-solid-state secondary battery in which Co-LATP is also used as the negative electrode active material.

As shown in FIG. 28, a CV measurement at room temperature revealed delithiation peaks near 2.5V and 2.9V and lithiation peaks near 2.4V and 2.1V. As shown in FIG. 29, a CV measurement at 80° C. revealed a clearer delithiation peak near 2.5V and a clearer lithiation peak near 2.1V. From the redox potentials of the LiCoPO$_4$ positive electrode active material (4.8V vs. Li/Li$^+$) and the Co-LATP negative electrode active material (2.5V vs. Li/Li$^+$), it was estimated that the cell was operating at 2.3V. Next, charging/discharging tests were performed. At room temperature, the cell was charged at a current of 20 μA to a final voltage of 3V and discharged at a current of 4 μA to a final voltage of 1.5V. This was repeated for 4 cycles. As shown by the charge/discharge curves in FIG. 30, the cell had a relatively low capacity of 3-4 μA at room temperature, but still functioned nonetheless. The same test was then repeated at 80° C., using the same charging/discharging currents as in the room temperature test but using an ending charging voltage of 2.5V. As shown by the charge/discharge curves in FIG. 31, the cell was much more responsive, and the discharge capacity increased to 12 μAh. This suggests that using LiCoPO$_4$ for the positive electrode active material and Co-LATP for both the solid electrolyte and the negative electrode active material makes it possible to produce a 2.3V all-solid-state battery.

Working Example 10

Production and Performance Evaluation of Multilayer Chip-Type All-Solid Secondary Battery A multilayer all-solid-state secondary battery was produced using LiCoPO$_4$ for the positive electrode active material and Co-LATP for both the solid electrolyte and the negative electrode active material. The composite paste of LiCoPO$_4$, Co-LATP, and Pd used in Working Example 9 was pattern-printed on a green sheet prepared as in Working Example 7. A Pd paste was printed on top of that pattern using the same pattern, and then another layer of the composite paste was pattern-printed to produce a positive electrode unit green sheet. Next, the Pd pasted was pattern-printed on top of a Co-LATP green sheet with the pattern slightly shifted relative to the position of the pattern on the positive electrode unit to produce a negative electrode unit green sheet. A plurality of these positive electrode unit green sheets and negative electrode unit green sheets were produced and then layered together alternately to assemble a 30-cell stack, each cell including a current collector layer, a negative electrode active material layer, a solid electrolyte layer, a positive electrode active material layer, and another current collector layer. Here, two additional green sheets to which no printing process had been applied were added between the positive and negative electrodes of each cell to increase the number of solid electrolyte layer green sheets between the positive and negative electrodes of each cell to three. Fifteen-layer stacks of green sheets to which no printing process had been applied were formed on the uppermost and lowermost surfaces of the main cell stack as cover layers. The multilayer cell stack thus produced was then compressed at 130° C. and 42 MPa in an isostatic press and cut into a chip shape to expose the positive electrodes and negative electrodes on the left and right sides. The chip was sintered at 850° C. in air, and a resin silver paste was applied to form external electrodes. The assembly was then dried at 150° C. to form a multilayer chip-shaped all-solid-state secondary battery. The external dimensions of the chip were measured, and the chip was found to be 5 mm in length and width and 1.1 mm in thickness.

Performance Evaluation of Multilayer Chip-Type All-Solid Secondary Battery

Figure 32:
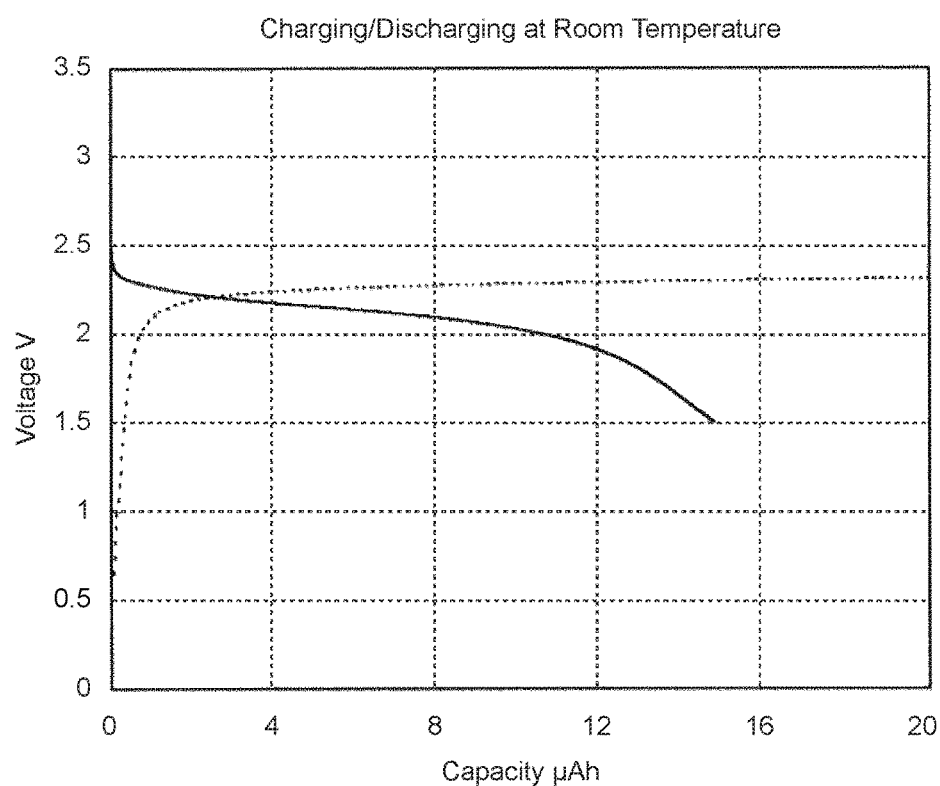
FIG. 32 is a graph showing the charge/discharge curves of a multilayer chip-shaped all-solid-state secondary battery.

A charging/discharging test was performed at room temperature. As shown in FIG. 32, when charged at 5 µA (for 4 hours or to a final voltage of 3V) and discharged at 1 µA (for 20 hours or to a final voltage of 1.5V), the battery exhibited a discharge capacity of 14.7 µAh. When the cross section and the like of the chip were examined, the effective area was calculated to be 4.1 cm². This value is approximately three times greater than the 1.44 cm² effective area of the disk-shaped battery, and therefore the capacity of the multilayer chip-shaped all-solid-state secondary battery seems appropriate given the capacity of the disk-shaped all-solid-state secondary battery at room temperature. This suggests that when using $LiCoPO_4$ for the positive electrode active material and Co-LATP for both the solid electrolyte and the negative electrode active material to produce a 2.3V all-solid-state battery, increasing the number of layers makes it possible to increase the battery capacity.

Effects

Due to the use of a solid electrolyte, the all-solid-state secondary batteries of the present invention are not prone to catching fire or leaking fluid. Moreover, the materials used can be sintered at a high temperature, thereby making it possible to promote densification and achieve a high ionic conductivity as well as reduce resistance at the interfaces between the materials.

Furthermore, the solid electrolyte layer and the positive electrode active material layer can be sintered together at the same time, thereby making it possible to make the solid electrolyte layers thinner and increase the overall number of layers in the structure. This, in turn, makes it possible to produce an all-solid-state secondary battery with high energy density and output density.

Also, no additional processes or members such as auxiliary sintering additives or coatings are required, thereby making it possible to provide the battery at low cost.

INDUSTRIAL APPLICABILITY

The present invention may be applied to a low cost process for manufacturing all-solid-state secondary batteries. The present invention may also be applied when manufacturing all-solid-state secondary batteries that exhibit high stability and safety of use.

Furthermore, due to the use of materials that can be assembled together as a large number of thin layers, the present invention can be applied when manufacturing all-solid-state secondary batteries with high energy density and output density.

The present invention can be applied when manufacturing extremely small chip-type batteries. The present invention can also be applied to replace conventional packaged electricity storage devices.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A method for manufacturing an all-solid-state secondary battery, comprising:
   sintering, at the same time together, a solid electrolyte layer containing a phosphate having a NASICON-type structure and a positive electrode active material layer formed of an olivine-type active material $LiMPO_4$ to form a sintered compact, where M is a transition metal; and
   adding, to a material for forming the solid electrolyte layer before the sintering, 0.05 moles to 0.3 moles of a transition metal element that is the same as the transition metal M used in the positive electrode active material layer for every 1 mole of the phosphate in the material for forming the solid electrolyte layer,
   wherein the phosphate in the solid electrolyte layer is expressed as:

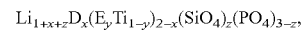

$Li_{1+x+z}D_x(E_yTi_{1-y})_{2-x}(SiO_4)_z(PO_4)_{3-z}$, where $0 \leq x \leq 0.8$, $0 \leq y < 1$, $0 \leq z \leq 0.5$, D is at least one element of trivalent aluminum (Al) and gallium (Ga), and E is at least one element of quadrivalent germanium (Ge) and zirconium (Zr).

2. The method for manufacturing the all-solid-state secondary battery according to claim 1, further comprising the transition metal element being added while synthesizing the material for forming the solid electrolyte layer.

3. The method for manufacturing the all-solid-state secondary battery according to claim 1, wherein M is at least one of manganese (Mn), cobalt (Co), and nickel (Ni).

* * * * *